United States Patent [19]
Chang et al.

[11] Patent Number: 6,043,960
[45] Date of Patent: Mar. 28, 2000

[54] INVERTED MERGED MR HEAD WITH TRACK WIDTH DEFINING FIRST POLE TIP COMPONENT CONSTRUCTED ON A SIDE WALL

[75] Inventors: Thomas Young Chang; Jyh-Shuey Jerry Lo, both of San Jose, Calif.

[73] Assignee: International Business Machines Corporation, Armonk, N.Y.

[21] Appl. No.: 08/995,441

[22] Filed: Dec. 22, 1997

[51] Int. Cl.[7] .................................................... G11B 5/147
[52] U.S. Cl. .......................... 360/126; 360/113; 360/119; 360/122
[58] Field of Search ................................... 360/113, 119, 360/122, 126

[56] References Cited

U.S. PATENT DOCUMENTS

| 4,151,574 | 4/1979 | Gerkema et al. | 360/113 |
| 4,912,584 | 3/1990 | Mallary et al. | 360/126 |
| 5,025,341 | 6/1991 | Bousquet et al. | 360/120 |
| 5,719,730 | 2/1998 | Chang et al. | 360/113 |
| 5,726,841 | 3/1998 | Tong et al. | 360/122 |
| 5,801,910 | 9/1998 | Mallary | 360/126 |

FOREIGN PATENT DOCUMENTS 63-04613  3/1988  Japan .

Primary Examiner—William J. Klimowicz
Attorney, Agent, or Firm—Gray Cary Ware & Freidenrich LLP; Ervin F. Johnston

[57] ABSTRACT

A method of making provides an inverted merged MR head wherein frame plating is not required for forming a highly defined submicron track width of a top first pole tip portion. A forming structure is formed on a bottom first pole tip portion with a vertical wall located at a site where one of the edges of the top first pole tip is to be located. The top first pole tip is sputtered or plated on the vertical wall of the forming structure with a thickness that defines the track width of the write head. A mask with a recessed portion may be employed for forming the top first pole tip with a back wall that defines a zero throat height of the head. In a preferred embodiment a forming layer is formed adjacent an opposite edge of the top first pole tip and then the top surfaces of the top first pole tip, the forming layer and the forming structure are lapped until these top surfaces are flush with one another. The material of the top first pole tip has an ion milling rate that is greater than the ion milling rates of the forming layer and the forming structure. Ion milling is then employed to ion mill the top of the top first pole tip at a greater rate than the other layers causing a recess which is centered above the top surface of the top first pole tip. After depositing a write gap layer and a seedlayer in the recess the second pole tip is deposited in the recess causing the base of the second pole tip to be substantially aligned with the top surface of the top first pole tip. Sloping surfaces extending from the base of the second pole tip are similar to notching of a first pole piece in the prior art which promotes flux transfer between the pole tips and minimizes stray flux from the second pole tip to the bottom first pole tip.

40 Claims, 18 Drawing Sheets

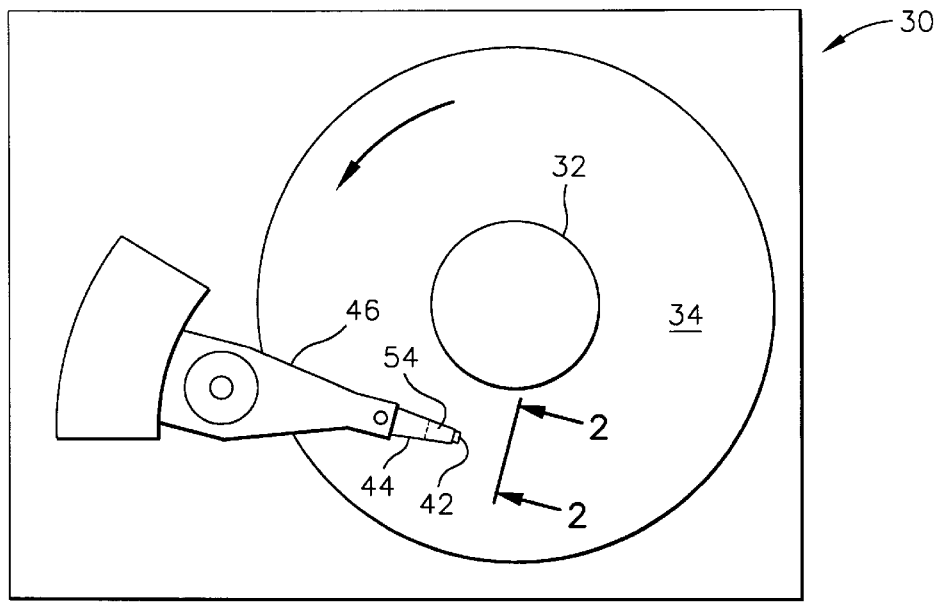
FIG. 1
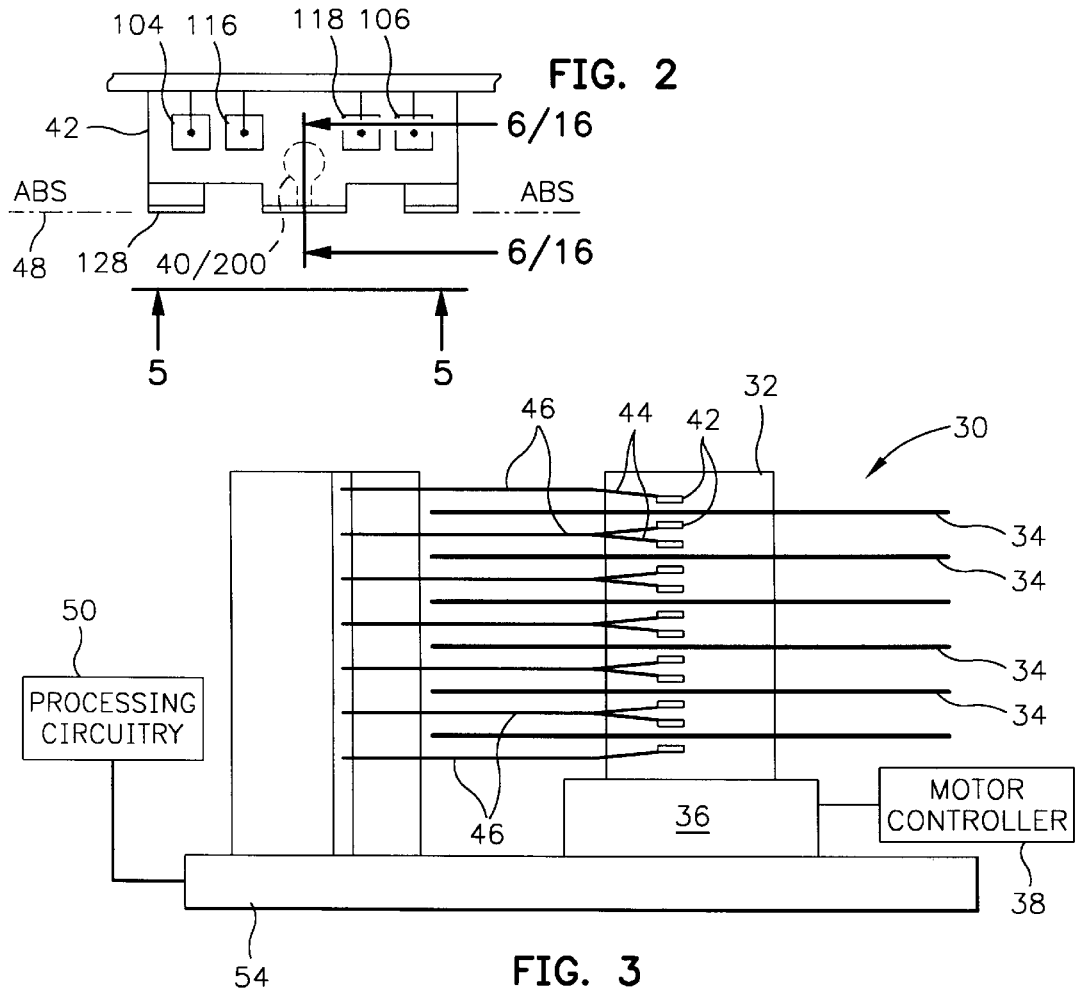
FIG. 2
FIG. 3

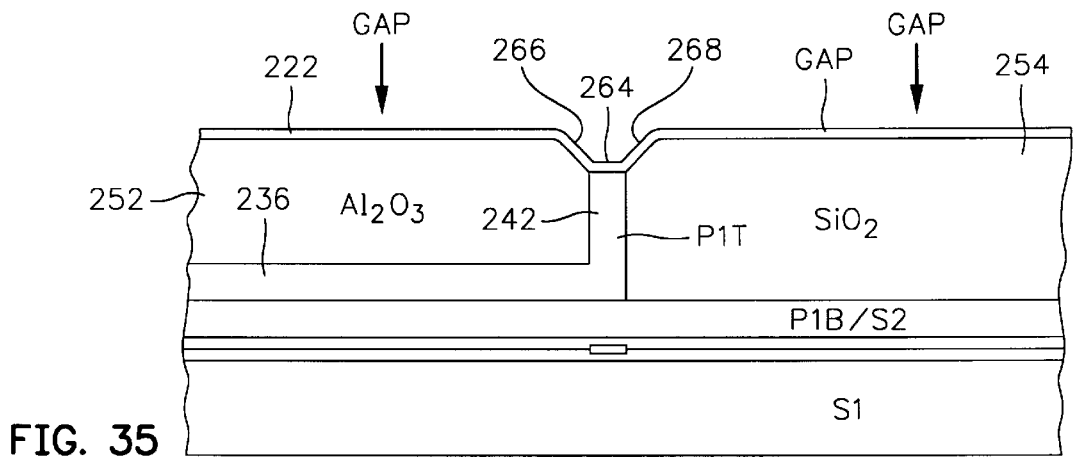
FIG. 35
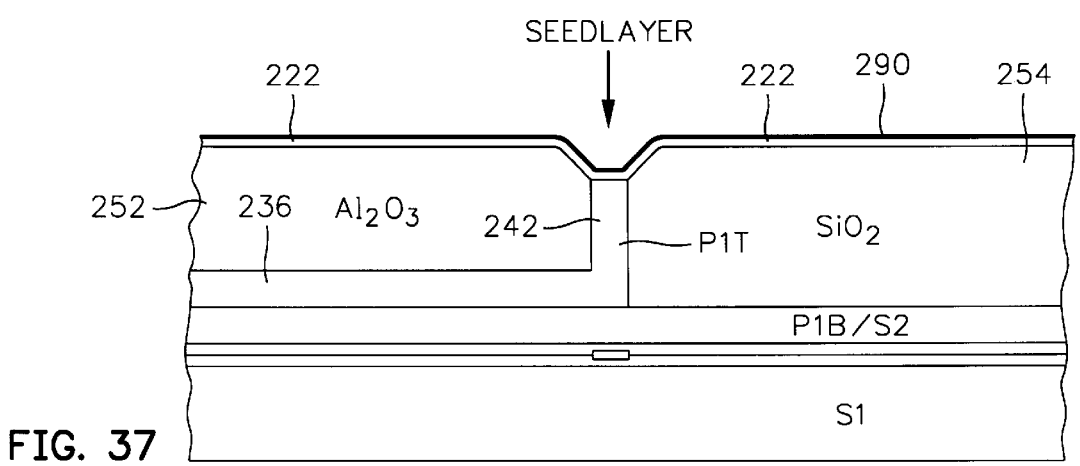
FIG. 36
FIG. 37
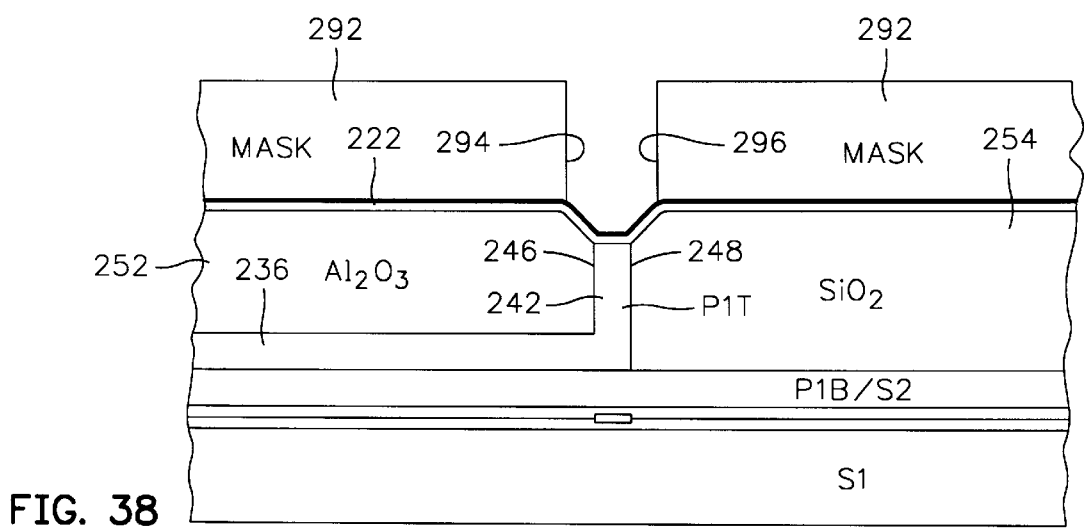
FIG. 38

INVERTED MERGED MR HEAD WITH TRACK WIDTH DEFINING FIRST POLE TIP COMPONENT CONSTRUCTED ON A SIDE WALL

BACKGROUND OF THE INVENTION

1. Field of the Invention

The present invention relates to a merged magnetoresistive (MR) head with a track width defining first pole tip component constructed on a side wall and, more particularly, to a first pole tip component that is constructed by sputter deposition or plating on a side wall of a forming structure that remains in the head.

2. Description of the Related Art

An inductive write head includes a coil layer embedded in first, second and third insulation layers (insulation stack), the insulation stack being located between first and second pole piece layers. A gap is formed between the first and second pole piece layers by a gap layer at an air bearing surface (ABS) of the write head. The pole piece layers are connected at a back gap. Currents are conducted through the coil layer, which produce magnetic fields in the pole pieces. The magnetic fields fringe across the gap at the ABS so as to write bits of magnetic field information in tracks on moving media, such as in circular tracks on a rotating magnetic disk or longitudinal tracks on a moving magnetic tape.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium. Since magnetic flux decays as it travels down the length of the narrow second pole tip, shortening the second pole tip will increase the flux reaching the recording media. Therefore, performance can be optimized by aggressively placing the flare point close to the ABS.

Another parameter important in the design of a write head is the location of the zero throat height (ZTH). The zero throat height is the location where the first and second pole pieces first separate from one another after the ABS. ZTH separation is imposed by an insulation layer, typically the first insulation layer in the insulation stack. Flux leakage between the first and second pole pieces is minimized by locating the ZTH as close as possible to the ABS.

Unfortunately, the aforementioned design parameters require a tradeoff in the fabrication of the second pole tip. The second pole tip should be well-defined in order to produce well-defined written tracks on the rotating disk. Poor definition of the second pole tip may result in overwriting of adjacent tracks. A well-defined second pole tip should have parallel planar side walls which are perpendicular to the ABS. In most write heads the second pole tip is formed along with the yoke after the formation of the first insulation layer, the coil layer and the second and third insulation layers. Each insulation layer includes a hard-baked photoresist having a sloping front surface.

After construction, the first, second and third insulation layers present front sloping surfaces which face the ABS. The ZTH defining insulation layer rises from a plane normal to the ABS at an angle (apex angle) to the plane. The sloping surfaces of the hard-baked resist of the insulation layers exhibit a high optical reflectivity. When the second pole tip and yoke are constructed, a thick layer of photoresist is spun on top of the insulation layers and photo patterned to shape the second pole tip, using the conventional photo-lithography technique. In the photo-lithography step, ultraviolet light is directed vertically through slits in an opaque mask, exposing areas of the photoresist which are to be removed by a subsequent development step. One of the areas to be removed is the area where the second pole piece (pole tip and yoke) are to be formed by plating. Unfortunately, when the location of the flare point is placed on the sloping surfaces of the insulation layers, ultraviolet light is reflected forward, toward the ABS, into photoresist areas at the sides of the second pole tip region. After development, the side walls of the photoresist extend outwardly from the intended ultraviolet pattern, causing the pole tip to be poorly formed after plating. This is called "reflective notching". As stated hereinabove this causes overwriting of adjacent tracks on a rotating disk. It should be evident that, if the flare point is recessed far enough into the head, the effect of reflective notching would be reduced or eliminated since it would occur behind the sloping surfaces. However, this solution produces a long second pole tip which quickly reduces the amount of flux reaching the recording medium.

The high profile of the insulation stack causes another problem after the photoresist is spun on a wafer. When the photoresist is spun on a wafer it is substantially planarized across the wafer. The thickness of the resist in the second pole tip region is excessively high since the second pole tip is substantially lower on the wafer than the yoke portion of the second pole piece. During the light exposure step the light progressively scatters in the deep photoresist like light in a body of water causing poor resolution during the light exposure step. Accordingly, there is a limit on the depth of the photoresist layer which is quantified in the art as the aspect ratio. The aspect ratio is the depth of the photoresist layer to the width of the pole tip. In order to obtain "reasonable" definition of the pole tip, the art has accepted an aspect ratio of three. For instance, a one micron wide pole tip of acceptable definition can be constructed with a photoresist layer no more than 3 microns thick. The aspect ratio places both width and height limitations on the pole tip when the pole tip is constructed by frame plating with a photoresist pattern. After the width is established the height of the pole tip becomes important regarding the amount of flux the pole tip will conduct without becoming saturated.

A scheme for minimizing the reflective notching and poor resolution problems is to construct the second pole piece of first and second components with the first component forming the second pole tip. The first component is constructed before the insulation layers to eliminate the reflective notching problem. After forming the first pole piece layer and the write gap layer, a photoresist layer is spun on the partially completed head. Ultraviolet light from the photo-patterning step is not reflected forward since the photoresist layer does not cover the insulation stack. Further, the photoresist is significantly thinner in the pole tip region so that significantly less light scattering takes place. After plating the first component the photoresist layer is removed and the first insulation layer, the coil layer and the second and third insulation layers are formed. The second component of the second pole piece is then stitched (connected) to the first component and extends from the ABS to the back gap. Since the second pole tip is well-formed, well-formed notches can be made in the first pole piece, as discussed hereinafter. However, with this head, the ZTH is dependent upon the location of the recessed end of the first component. Since the first component has to be long enough to provide a sufficient stitching area, this length may result in undesirable flux leakage between the first and second pole pieces. Further, the second pole piece component extends to the ABS. Since the second component is typically wider than the first component, as viewed at the ABS, the second pole piece has a T-shape. The upright portion of the T is the front edge of the first component of the second pole piece, and the cross of the T is the front edge of the second component. A problem with this configuration is that during operation, flux fringes from the outer corners of the second component to the first pole piece, causing adjacent tracks to be overwritten.

Once the second pole tip is formed, it is desirable to notch the first pole tip opposite the first and second corners at the base of the second pole tip so that flux transfer between the pole tips does not stray beyond the track width defined by the second pole tip. Notching provides the first pole piece with a track width that substantially matches the track width of the second pole piece. A prior art process for notching the first pole piece entails ion beam milling the gap layer and the first pole piece, employing the second pole tip as a mask. The gap layer is typically alumina and the first and second pole pieces and pole tips are typically Permalloy (NiFe). The alumina mills more slowly than the Permalloy; thus the top of second pole tip and a top surface of the first pole piece are milled more quickly than the gap layer. Further, during ion milling, there is much redeposition (redep) of alumina on surfaces of the workpiece. In order to minimize redep, the milling ion beam is typically directed at an angle to a normal through the layers, which performs milling and cleanup simultaneously. The gap layer in the field remote from the first and second corners of the second pole piece is the first to be milled because of a shadowing effect at the first and second corners caused by the second pole tip when the ion beam is angled. In this case, the ion stream will overmill the first pole piece before the gap layer is removed adjacent the first and second corners of the second pole tip in the region where the notching is to take place. After the gap layer is removed above the sites where the notching is to take place, ion milling continues in order to notch the first pole piece. Overmilling of the first pole piece continues to take place in the field beyond the notches, thereby forming surfaces of the first pole piece that slope downwardly from the notches. As is known, such overmilling of the first pole piece can easily expose leads to the MR sensor, thereby rendering the head inoperative.

Even if overmilling of the first pole piece can be controlled, there is potentially a more troublesome problem, namely overmilling the top of the second pole tip when the unwanted portions of the gap layer are milled and notches are formed. In order to compensate for this overmilling, the aforementioned aspect ratio is increased so that a top portion of the top of the second pole tip can be sacrificed during the milling steps. When the aspect ratio is increased, definition of the second pole tip is degraded because of the thickness of the photoresist, discussed hereinabove, resulting in track overwriting.

In order to minimize overmilling of the first pole piece, another process removes the gap layer, except for a desired portion between the first and second pole tips, by a wet etchant. After the unwanted portions of the gap layer are removed, the first pole piece is ion milled, employing the second pole tip as a mask. The only overmilling of the first pole piece is due to the ion milling of the notches at the first and second corners of the gap layer. This process also eliminates significant redep of the alumina. A problem with this process, however, is that the etching undercuts the gap layer under the base of the second pole tip which is a critical area for the transfer of field signals. The undercut regions provide spaces which can be filled with Permalloy redeposited during subsequent ion milling of the first pole piece or redep of other foreign material upon subsequent milling and clean up steps.

Still another process proposes plating the top and first and second side walls of the second pole tip with a protective metal layer before etching the unwanted portions of the gap layer. When the etching reaches the inside thickness of each protective metal layer, the process is stopped so that the gap layer is not undercut under the base of the second pole tip. It is proposed that the protective metal layer remain in the head because of the difficulty of removing it. Disadvantages of this process are the difficulty of the plating step and the potential of the protective metal layer interfering with the magnetics of the second pole tip.

Another problem with the prior art merged MR head is that the profile of the MR sensor between the first and second gap layers is replicated through the second shield/first pole piece layer to the write gap layer causing the write gap layer to be slightly curved concave toward the MR sensor. When the write head portion of the merged MR head writes data the written data is slightly curved on the written track. When the straight across MR sensor reads this curved data there is progressive signal loss from the center of the data track toward the outer extremities of the data track.

Accordingly, there is a strong-felt need to provide an inductive write head portion of a merged MR head wherein a highly defined track width defining pole tip can be formed without reflective notching and curved written data problems.

SUMMARY OF THE INVENTION

The aforementioned reflective notching problem is obviated by an inverted write head portion of the merged MR head. Similar to the prior art write head the inverted write head includes first and second pole pieces that are connected at a back gap and that are separated by a gap layer at the ABS. The first pole piece has first and second layers that terminate as bottom and top first pole tips respectively at the ABS and the second pole piece has a single second pole piece layer that terminates as a second pole tip at the ABS. The top first pole tip is located between the bottom first pole tip and the second pole tip. Each of the bottom and top first pole tips and the second pole tip have an ABS edge at the ABS that has a width. The inverted write head differs from the prior art write head in that the width of the ABS edge of the top first pole tip defines a track width of the write head. This width is less than the width of the ABS edge of the bottom first pole tip.

Since the top first pole tip defines the track width, the reflective notching problem is overcome. The first and second layers of the first pole piece are constructed before construction of the insulation stack thereby obviating light reflection into the pole tip region.

The top first pole tip of the inverted merged MR head is presently made by frame plating. A seed layer is sputter deposited on the bottom first pole tip. A photoresist frame is then formed on the bottom first pole tip with an opening defining the site of the top first pole tip. The top first pole tip is plated in the opening and the photoresist is stripped. The track width of the top first pole tip is limited by the definition capability of the photoresist frame. Even though the top first pole tip is constructed on the flat surface of the bottom first pole tip the aforementioned aspect ratio governs the definition and limits the track width. With an aspect ratio of three required to obtain satisfactory resolution with frame plating, the photoresist layer should be no higher than three times as high as the track width. If aspect ratio was the only design parameter the top first pole tip could be constructed with a submicron track width, such as 0.5 µm, by simply forming a photoresist frame with a thickness of 1.5 µm. Another design parameter is that the pole tip have a sufficient ABS cross section so that it will carry flux signals without saturation. Still another problem is that the very thin pedestal like top first pole tip is very fragile after removal of the photoresist frame and is easily broken by subsequent construction steps.

The present invention provides a method of making the top first pole tip of the inverted head without frame plating. A forming structure is formed on the bottom first pole tip by any suitable means such as sputter deposition. The forming structure is then photoresist patterned with an opening adjacent the top first pole tip site. The forming structure is preferably a material, such as $SiO_2$ that can be removed by reactive ion etching (RIE), such as RIE that is fluorine based. The forming structure exposed by the photoresist opening is then removed by RIE which leaves the forming structure with a vertical wall. The photoresist pattern is then stripped. After forming another photoresist mask pole tip material, such as NiFe, is then formed on the vertical wall by any suitable means, such as sputter deposition or plating. It should be noted that there is no lower limitation on the thickness (track width) of the sputtered or plated top first pole tip except the aforementioned flux carrying requirement to avoid saturation. This design parameter can be accommodated by the height of the vertical wall. Accordingly, with the present invention the thickness of the top first pole tip and its height are designed to provide the desired track width and flux carrying capability. A feature of the invention is that a recessed portion of the photoresist may be employed for forming the top first pole tip with a back wall that defines the ZTH.

In the preferred embodiment, the second pole tip is constructed by construction steps that self aligns the second pole tip with the top first pole tip. This is accomplished by first depositing a forming layer on top of the top first pole tip, the top of the forming structure and the exposed portion of the bottom first pole tip. Lapping is then employed until the forming layer, the top first pole tip and the forming structure have top surfaces that are flush with respect to one another. The forming layer is preferably alumina ($Al_2O_3$). The forming layer and the forming have a milling rate that is less than the top first pole tip. The top surfaces are then ion milled which causes the top surface of the top first pole tip to be depressed below the top surfaces of the forming layer and the forming structure. This causes a first recess to be formed which is directly above the top surface of the top first pole tip. A write gap layer is then sputter deposited in the first recess which causes the write gap layer to have a second recess which substantially replicates the first recess. After forming a photoresist frame with an opening above the second recess the second pole tip is sputter deposited. The second pole tip will have a base that substantially matches the top surface of the top first pole tip and that is aligned therewith. The second pole tip is for all practical purposes notched similar to notching of the first pole piece in the prior art for the purpose of confining field signals between the pole tips within the track width of the track width defining pole tip. It should be noted that the placement of the photoresist pattern for the second pole tip is not critical since the top first pole tip and the second pole tip are self aligned. The opening in the photoresist pattern can be kept slightly larger than the track width so that stray flux between the second pole tip and the much wider bottom first pole tip will be minimized. Further it should be noted that the lapping step will remove any replication of the profile of the MR sensor at the write gap. This overcomes the aforementioned curved write gap problem.

In a preferred embodiment the method also makes an inverted merged MR head wherein the second pole tip is configured, similar to notching, so that flux will be transferred between the top first and second pole tips substantially within the track width defined by the top first pole tip. More specifically, the second pole tip is provided with a base that is substantially the same size and is aligned with the top of the top first pole tip and with tapered edges that slope upwardly from the base to vertical side edges of the second pole tip. While the tapered edges are in contrast to the vertical edges formed in the prior art first pole piece, the performances are substantially the same. In the present invention, a narrow pedestal-type top first pole tip is located on a wide bottom first pole tip and the second pole tip is directly above aligned with the top first pole tip. A gap layer separates the top of the top first pole tip from the base of the second pole tip and has a recess that is filled with the second pole tip.

In the preferred method a thick non-magnetic non-conductive forming layer for forming the second pole tip is formed on the bottom and top first pole tips. The forming layer substantially replicates the profiles of the bottom and top first pole tips. Because of the high profile of the top first pole tip the pole tip forming layer has a high profile above the top first pole tip. The next step is to lap the pole tip forming layer until it is flat with the top of the top first pole tip. The top of the first pole tip and the pole tip forming layer are then milled by ion milling. The rate of milling of the material of the top first pole tip is greater than the rate of milling the material of the forming layer. In the preferred embodiment the top first pole tip is nickel iron and the forming layer is alumina. The milling causes the top of the top first pole tip to be recessed below the forming layer and causes the forming layer to have tapered edges that slope upwardly from the top of the top first pole tip. The top of the top first pole tip and the tapered edges of the forming layer form a recess. The write gap layer is formed in the recess and, because of replication, has a recess. The write gap layer is very thin, such as 0.1 to 0.5 µm. The recess is preferably very shallow, such as 250–500 nm. The second pole tip is formed in the recess of the write gap layer. As stated hereinabove, the base of the second pole tip is substantially the same width as the top of the top first pole tip and is aligned therewith by a self aligning aspect of the method of making. Further, the second pole tip has upwardly sloping edges that are similar to notching as described hereinabove. The slope of the sloping edges of the second pole tip are less than 90°, such as 45°. The upwardly sloping edges of the of the second pole tip may merge with vertical side edges that define the width of the second pole tip. The width of the second pole tip, after the slope, may be 1–3 µm wider than the width (track width) of the top first pole tip.

The second pole tip is constructed after constructing the insulation stack and one or more coil layers. As stated hereinabove, this will cause reflective notching if the second pole piece layer has a flare. Even though the second pole tip is notched by reflective notching this will not affect the performance of the write head since the portion of the second pole tip immediately above the top first pole tip conforms to the shape of the top first pole tip and is aligned therewith. Reflective notching of the second pole tip beyond its well-formed portion above the top first pole tip will not affect flux transfer between the pole tips. Further, even though a photoresist mask employed for making the second pole tip may not be aligned with the top first pole tip, the flux transferring portion of the second pole tip is aligned with the top first pole tip by the method of making.

While the head is preferably a merged MR head where the second shield layer of the read head portion also serves as the bottom first pole tip of the write head portion, the invention also includes a piggyback head wherein the second shield layer and the bottom first pole tip are separate layers. Further, while the magnetic disk preferably rotates in a direction so that the second pole tip is the last pole tip to pass the written track the invention also includes a disk drive wherein the top first pole tip is last pole tip to pass the written track.

An object of the present invention is to provide a method of making a pole tip with dimensions that are not limited by the aspect ratio of frame plating.

Another object is to provide a method of making a submicron track width pole tip that has sufficient flux carrying capability to avoid saturation.

A further object is to provide a method of making a track defining pole tip of a first pole piece that has a submicron track width, high definition and flux carrying capability to avoid saturation and a back wall that defines the ZTH.

Still another object is to provide a method of making an inverted merged MR head wherein a well-formed submicron track width defining top first pole tip is aligned with a second pole tip, a write gap layer has no curvature and there is minimal flux leakage between the second pole tip and a bottom first pole tip.

Still a further object is to provide a method of making a pole tip wherein the thickness of sputter deposition or plating defines the width of the pole tip.

Still another object is to provide a method of making a submicron pedestal type pole tip which is supported to prevent the pole tip from being broken during subsequent construction steps.

Still a further object is to provide a submicron track width pole tip that has sufficient flux carrying capability to avoid saturation.

Still another object is to provide a track width defining pole tip of a first pole piece that has a submicron track width, high definition and flux carrying capability to avoid saturation.

Still a further object is to provide an inverted merged MR head wherein a well-formed submicron track width defining top first pole tip is aligned with a second pole tip, a write gap layer has no curvature and there is minimal flux leakage between the second pole tip and a bottom first pole tip.

Other objects and advantages of the invention will be more greatly appreciated upon reading the following description taken together with the accompanying drawings.

DESCRIPTION OF THE DRAWINGS

FIG. 1 is a planar view of an exemplary magnetic disk drive;

FIG. 2 is an end view of a slider with a magnetic head of the disk drive as seen in plane 2—2;

FIG. 3 is an elevation view of the magnetic disk drive wherein multiple disks and magnetic heads are employed;

FIG. 35 is the same as FIG. 34 except a write gap layer has been deposited in the first recess to provide the write gap layer with a second recess;

FIG. 36 is a block diagram illustrating the construction of the first insulation layer, the coil layer and the second and third insulation layers shown in FIG. 16;

FIG. 37 is the same as FIG. 35 except a seedlayer has been deposited;

FIG. 38 is the same as FIG. 37 except a photoresist pattern has been formed;

DESCRIPTION OF THE PREFERRED EMBODIMENTS

Magnetic Disk Drive

Figure 4:
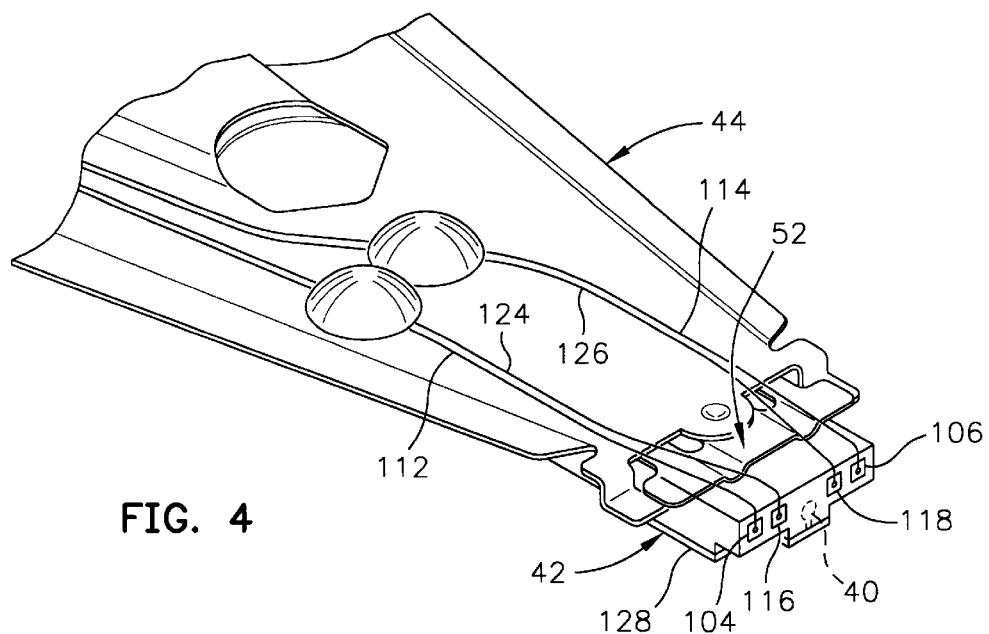
FIG. 4 is an isometric illustration of an exemplary suspension system for supporting the slider and magnetic head.

Referring now to the drawings wherein like reference numerals designate like or similar parts throughout the several views there is illustrated in FIGS. 1–3 a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to a head gimbal assembly (HGA) 52 which, in turn, is mounted to the suspension 44. The components described hereinabove may be mounted on a frame 54, as shown in FIG. 3.

Figure 5:
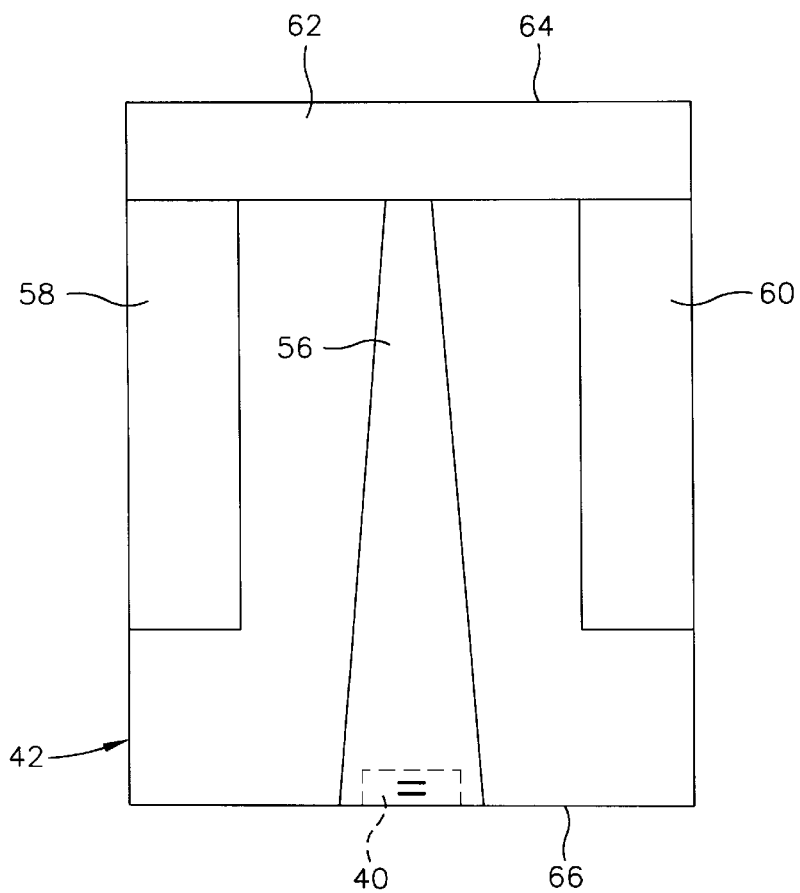
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
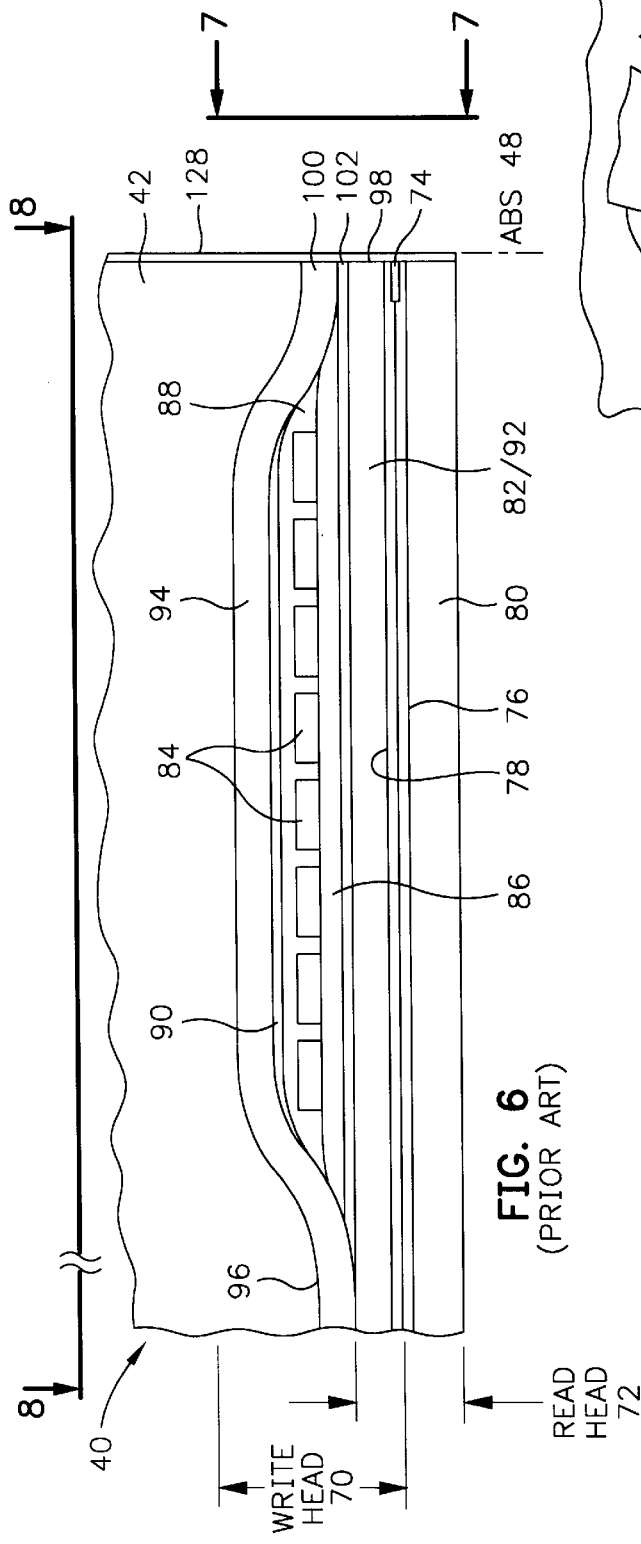
FIG. 6 is a partial view of the slider and a prior art magnetic head as seen in plane 6—6 of FIG. 2.
Figure 7:
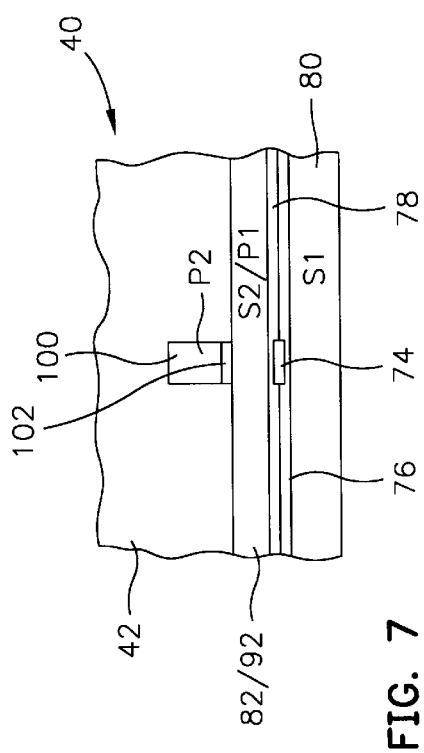
FIG. 7 is a partial ABS view of the slider taken along plane 7—7 of FIG. 6 to show the read and write elements of the prior art magnetic head.

FIG. 6 is a side cross-sectional elevation view of the merged MR head 40 which has a prior art write head portion 70 and a read head portion 72, the read head portion employing an MR sensor 74. FIG. 7 is an ABS view of FIG. 6. The sensor 74 is located between first and second gap layers 76 and 78 and the gap layers are located between first and second shield layers 80 and 82. In response to external magnetic fields, the resistance of the sensor 74 changes. A sense current $I_s$ conducted through the sensor causes these resistance changes to be manifested as potential changes. These potential changes are then processed as readback signals by the processing circuitry 50 shown in FIG. 3.

Prior Art Magnetic Write Head

Figure 8:
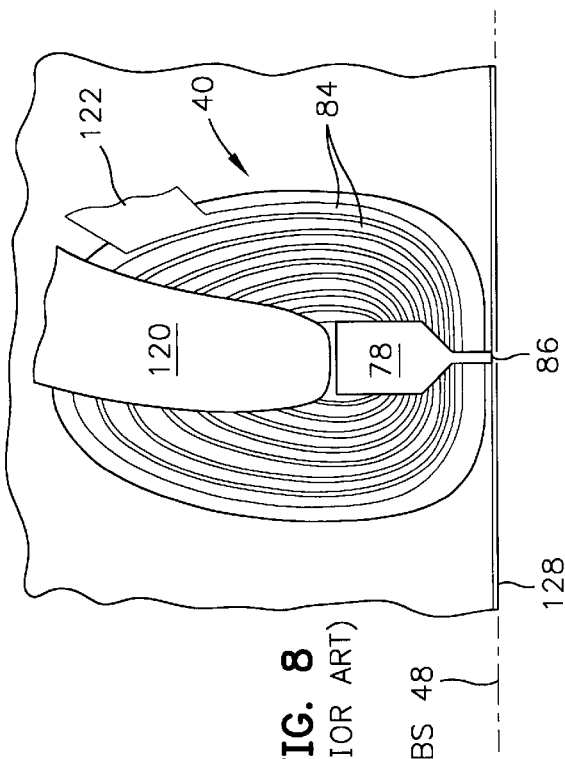
FIG. 8 is a view taken along plane 8—8 of FIG. 6 with all material above the second pole piece removed.

The prior art write head portion of the merged MR head includes a coil layer 84 located between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are located between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads from the sensor 74 to leads 112 and 114 on the suspension 44 and third and fourth solder connections 116 and 118 connect leads 120 and 122 from the coil 84 (see FIG. 8) to leads 124 and 126 on the suspension. A wear layer 128 may be employed for protecting the sensitive elements of the magnetic head, as shown in FIGS. 2, 4, 6 and 7. It should be noted that the merged MR head 50 employs a single layer 82/92 to serve a double function as a second shield layer for the read head and as a first pole piece for the write head. A piggyback MR head employs two separate layers for these functions.

Figure 9:
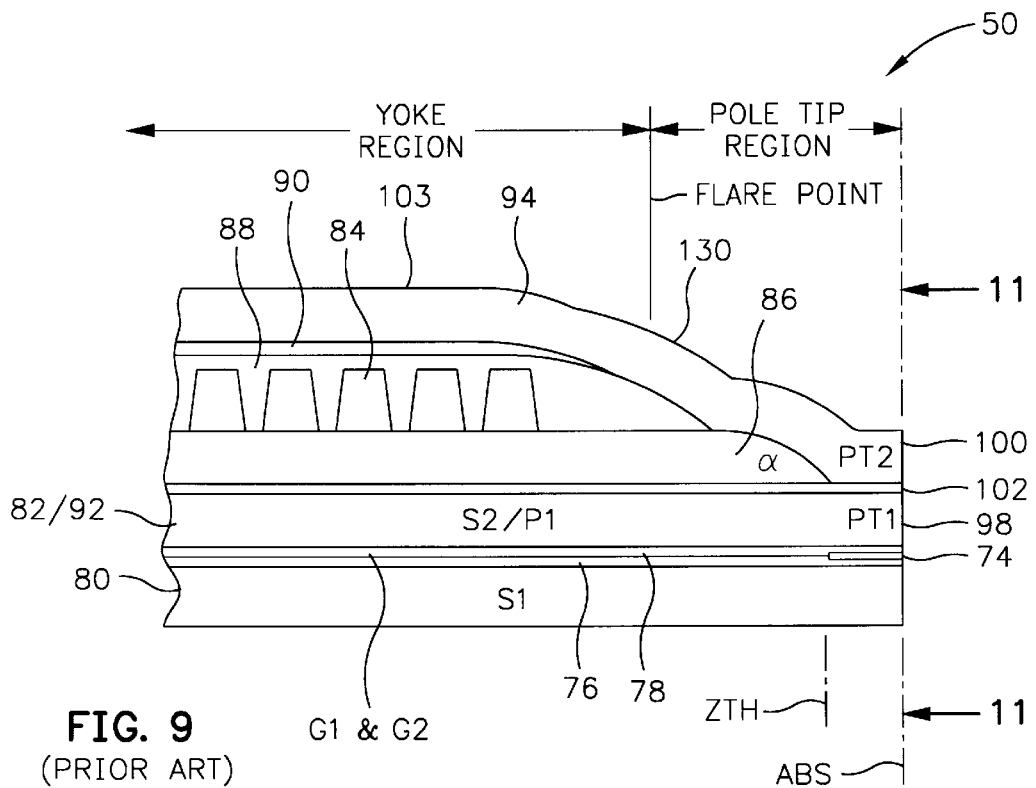
FIG. 9 is an enlarged front portion of the prior art magnetic head of FIG. 6 to show various details thereof.
Figure 12:
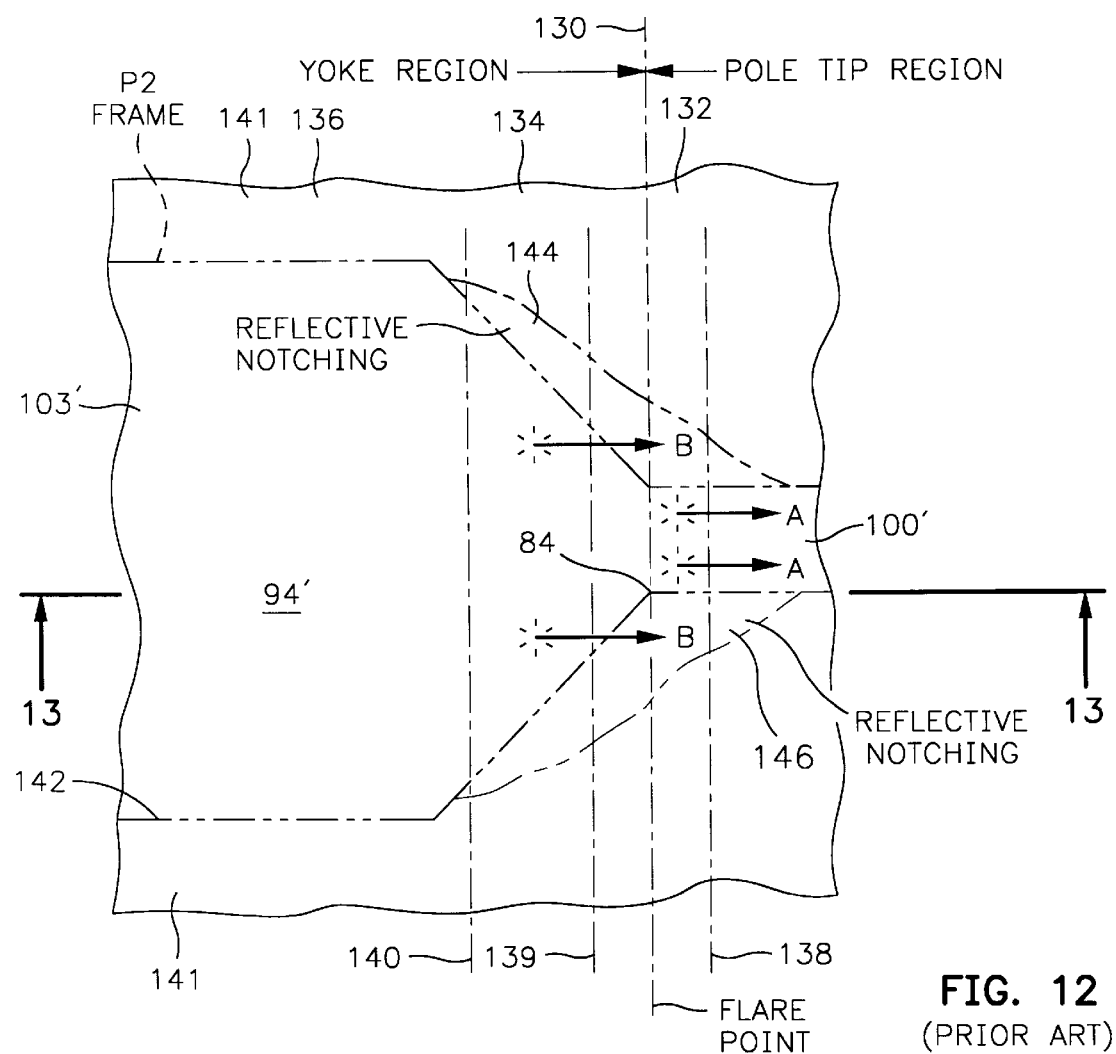
FIG. 12 is a view taken along plane 12—12 of FIG. 10.

As shown in FIG. 9, the second pole piece layer 94 has a pole tip region and a yoke region, the merging of these components being defined by a flare point 130 which is the location where the second pole piece layer 94 begins to widen as it recesses in the head. The second pole tip region extends from the ABS to the flare point 130, and the yoke region extends from the flare point 130 to the back gap 96 (see FIG. 6). In FIG. 12 are shown the pole tip region, the yoke region and the flare point 130 as defined by a photoresist mask (P2 frame).

Figure 13:
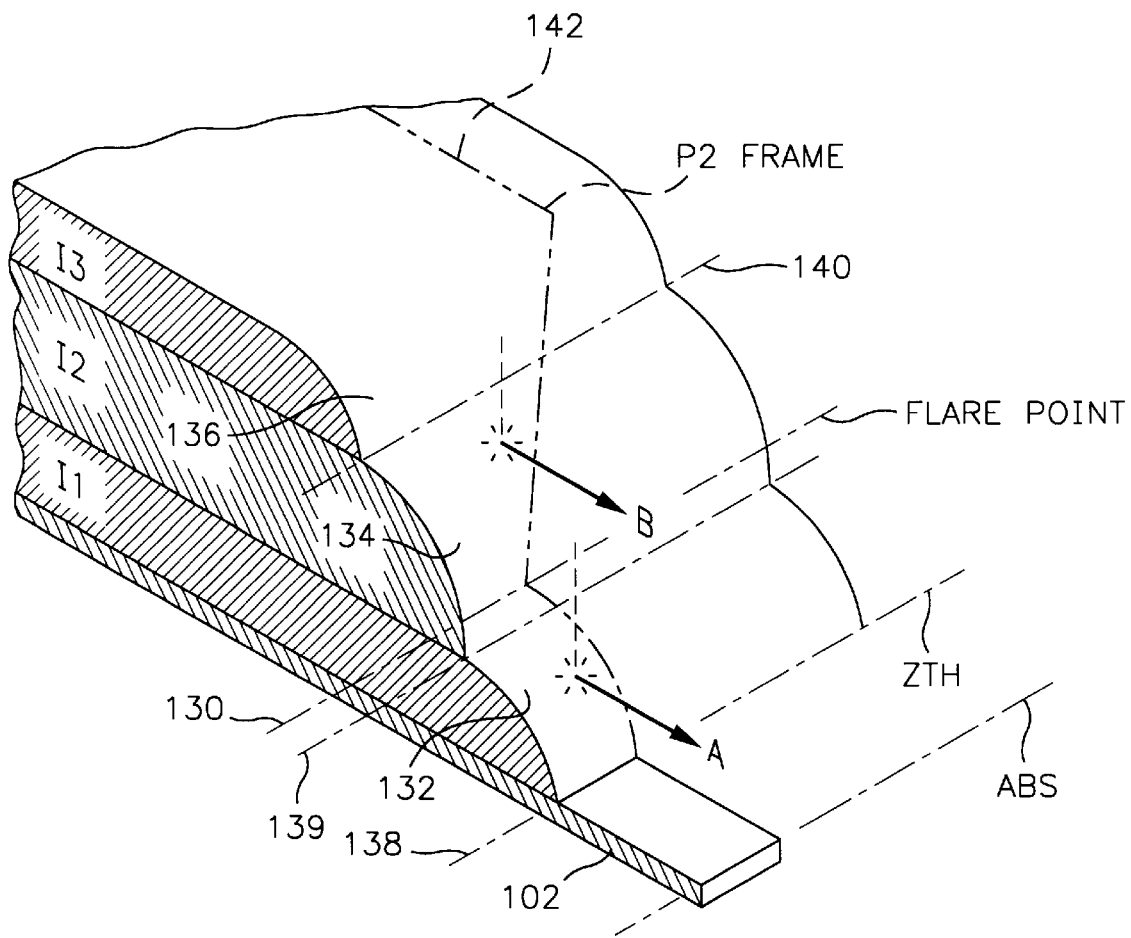
FIG. 13 is an isometric illustration of FIG. 10 without the P2 photoresist.

The location of the flare point 130, shown in FIGS. 9, 12 and 13, is an important design parameter of the write head. The further the flare point is recessed into the head, the longer the pole tip 100, which increases magnetic inductance and the likelihood that the pole tip 100 will saturate in response to flux from the coil layer 84. In the past it has been difficult to locate the flare point closer to the ABS than 10 $\mu$m because of a fabrication problem in making the second pole tip.

Another important design parameter in making the write head is the location of a zero throat height (ZTH), which is where the first and second pole piece layers 92 and 94 first separate from one another behind the ABS. It is important to locate the ZTH as close as possible to the ABS (typically within about 1 $\mu$m) in order to reduce flux loss between the pole pieces before the fields reach the gap layer 102 at the ABS. In the prior art, locating the ZTH close to the ABS contributed to the aforementioned problem of fabricating a well-defined second pole tip 100.

Figure 10:
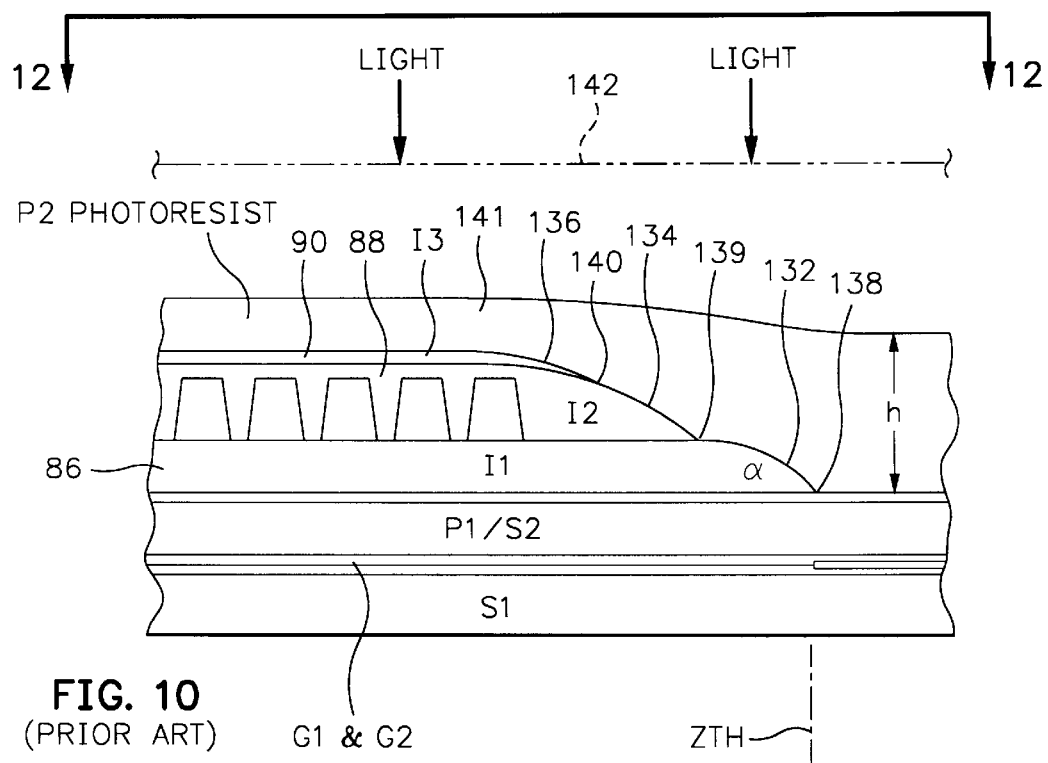
FIG. 10 is the same as FIG. 9 except a photo-patterning step is illustrated for constructing the second pole tip of the magnetic head.

FIG. 10 shows the prior art head of FIG. 9 during the step of constructing the second pole piece 94 (see FIG. 9). In FIG. 10 the first, second and third insulation layers 86, 88 and 90 are shown with sloping surfaces 132, 134 and 136 respectively, which terminate at apexes 138, 139 and 140 respectively. As stated hereinabove, the first, second and third insulation layers are hard-baked photoresist which results in the sloping surfaces 132, 134 and 136 being highly reflective to light. All of the sloping surfaces 132, 134 and 136 face the pole tip region where the second pole tip 100 of the second pole piece 94 is to be formed. As shown in FIG. 10, the second pole piece formed with a photoresist layer 141 that is spun on top of the partially completed head. The height of the photoresist layer may be as much as 12 μm thick in the pole tip region and is typically approximately 4.5 μm thick above the third insulation layer 90. Since the flare point 130 of the second pole piece 94 (shown in FIGS. 9, 12 and 13) is located on the sloping surfaces of the insulation layers, light directed through a second pole-shaped opening (not shown) in a mask 142 will be reflected from the sloping surfaces forward toward the ABS into areas of the photoresist layer 141 adjacent the pole tip region. This causes the pole tip region to be wider than the opening in the mask 142. This is referred to as "reflective notching" and is illustrated in FIG. 12.

The photoresist pattern for the second pole piece is shown in FIG. 12 at 94' which comprises the second pole tip pattern 100' and the second pole piece yoke pattern 103'. This is referred to as the "P2 frame". Reflective notching of the photoresist layer 141 (see FIG. 10) by light reflected at an angle of incidence from the sloping layers of the insulation layers is shown at 144 and 146 in FIG. 12. When light ray A is directed downwardly during the photo-imaging step of the photoresist, it is reflected at an angle of incidence from the insulation stack into the pole tip region without causing any reflective notching of the second pole tip. However, light ray B from the photo-imaging process is reflected from the sloping surfaces of the insulation layers behind the flare point 130 at an angle of incidence into the photoresist 141 in a side region outside the intended pole tip pattern 100'. It is light reflection B and similar light reflections that cause the reflective notching shown in FIG. 12.

Figure 11:
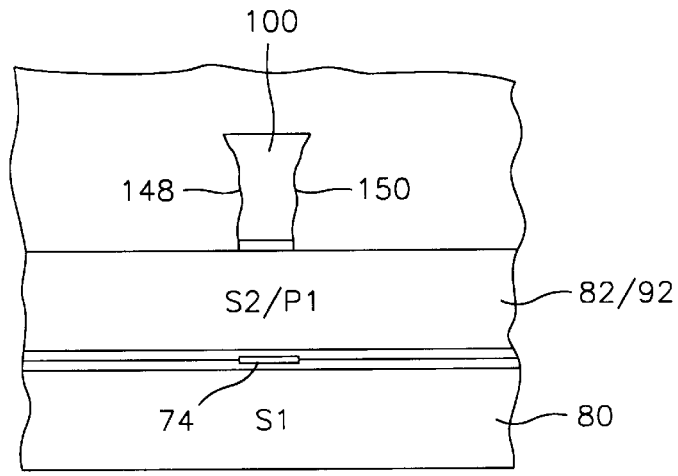
FIG. 11 is a view taken along plane 11—11 of FIG. 9.

When the second pole piece 94 is plated and the photoresist layer 141 is removed the head is complete, as shown in FIG. 9. However, the pole tip 100 is poorly formed, exhibiting irregular side walls 148 and 150, as shown in FIG. 11. Furthermore, photoresist notching results in a second pole tip 100 that has wider areas at the upper pole tip region than at the base of the pole tip (acijacent the write gap). If the irregular second pole tip 100 is used as a milling mask to notch the first pole tip 98, the wider regions of the second pole tip shadows the milling beam. Thus, the milling process is less effective at removing the first pole tip material directly beneath the side walls of the second pole tip. This results in a poorly formed P1 notched write head structure due to incomplete notching of the first pole piece 72. These poorly formed pole tips result in side writing of adjacent tracks.

Figure 14:
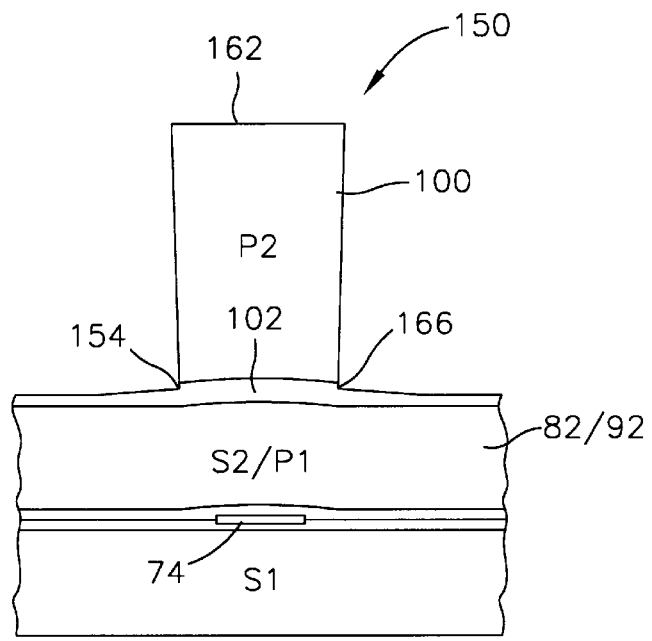
FIG. 14 is an ABS view of a prior art merged MR head before notching of the first pole piece.
Figure 15:
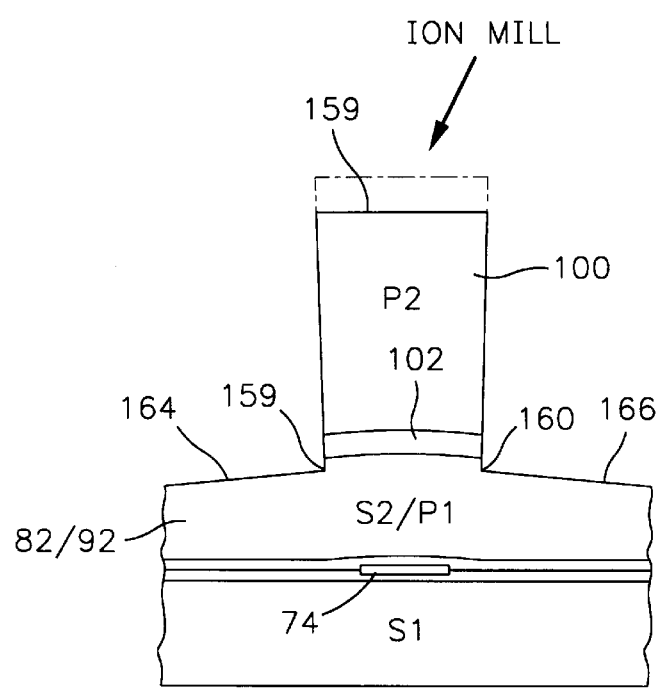
FIG. 15 is an ABS view of the merged MR head shown in FIG. 14 after ion milling to form the first pole piece with notches adjacent the second pole tip.

FIG. 14 is an ABS view of a prior art merged magnetic head 150 after a P2 seedlayer (not shown) has been removed by ion milling. It can be seen that the ion milling has slightly notched the gap layer 102 at 154 and 156. One method of notching the first pole piece layer 82/92 in the prior art is to ion mill through the gap layer into the first pole piece layer, as shown in FIG. 15. This notches the first pole piece layer at 159 and 160. Notching of the first pole piece layer 82/92 is desirable since it minimizes side writing between the second pole tip 100 and the first pole piece 82/92. Unfortunately, the process shown in FIG. 15 results in consumption of a top surface 159 of the second pole tip 100, as shown by the phantom lines in FIG. 15. Since ion milling is typically performed at an angle to a normal to the thin film layers, as shown in FIG. 15, the second pole tip 158 shadows the milling of the notching at 159 and 160 approximately 50% of the time while the workpiece is rotated. Consequently, the first pole piece 82/92 is overmilled in locations 164 and 166 which extend in the field remote from the notches 159 and 160 respectively. This causes the first pole piece 82/92 to have downwardly sloping top surfaces 164 and 166, as shown in FIG. 15, which undesirably reduces the thickness of the first pole piece 82/92 in the field. This can potentially expose sensitive elements beneath the first pole piece 82/92 rendering the head inoperative. The gap layer 102 mills more slowly than the Permalloy (NiFe) of the first and second pole pieces which results in more rapid ion milling of the top 159 of the second pole tip 100 and the fields 164 and 166 of the first pole piece 82/92 than the gap layer 102.

It can be seen from FIG. 15 that the beginning thickness of the second pole tip layer 100 has to be thicker than the final height of the second pole tip layer at 159 in order to compensate for the top portion of the second pole tip layer consumed by ion milling. This then requires the photoresist mask to be thicker which increases the aforementioned problem of additional light scattering during the light photo-imaging step as the photoresist layer increases in depth. This means that the second pole tip cannot be constructed as narrow because of loss of definition during the photoresist patterning. FIG. 15 also shows the write gap 102 slightly curved due to the profile of the MR sensor being replicated through the second shield first pole tip layer 82/92 to the gap layer 102. Accordingly, it can now be seen that the prior art merged MR head suffers from the disadvantages of reflective notching of the second pole tip, loss of a top portion of the second pole tip upon notching the first pole piece and write gap curvature. These problems are overcome by the inverted merged MR head described hereinbelow.

Another problem with the prior art head in FIGS. 14 and 15 is that the write gap 102 has a curvature due to replication of the profile of the MR sensor by the second gap layer 78 and the second shield/first pole piece layer 82/92. As discussed hereinabove, this causes information to be written in a curve across a track which is inaccurately read by the straight MR sensor 74.

Inverted Merged MR Head

Figure 16:
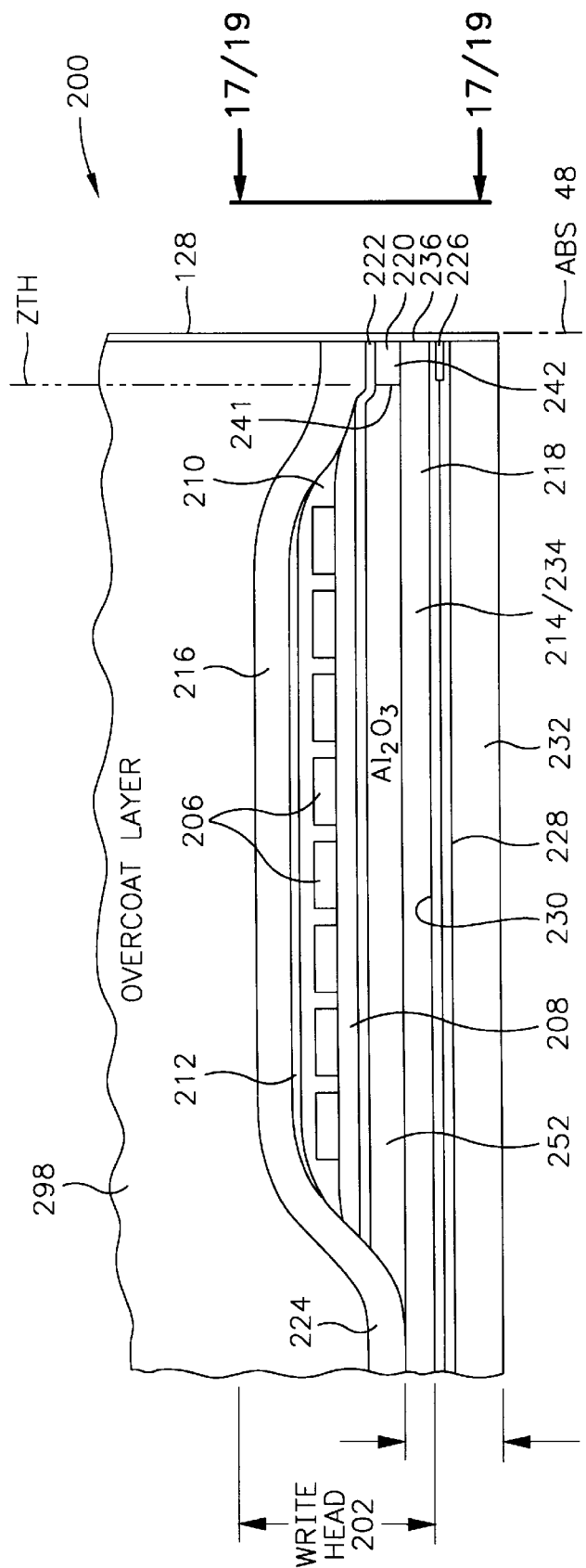
FIG. 16 is a longitudinal cross-sectional view of a portion of an inverted merged MR head which employs the present invention.

FIG. 16 is a longitudinal cross-sectional illustration of an inverted merged MR write head 200 which has a write head portion 202 and a read head portion 204. The write head portion 202 includes a coil layer 206 that is located between first and second insulation layers 208 and 210. A third insulation layer 212 may be employed for planarizing the head to eliminate ripples in the second insulation layer caused by the one or more coil layers 206. The first, second and third insulation layers are referred to as an "insulation stack". The coil layer 206 and the first, second and third insulation layers 208, 210 and 212 are located between first and second pole pieces 214 and 216. The first pole piece 214 includes first and second components 218 and 220 which will distinguish the inverted write head from the previously described prior art write head, as described in more detail hereinafter. The second component 220 of the first pole piece is separated from the second pole piece layer 216 by a write gap layer 222 at the ABS. The first component 218, which may be a flat layer, may be connected to the second pole piece layer 216 at a back gap 224.

A read sensor 226, which may be an anisotropic magnetoresistive (AMR) sensor or a spin valve sensor, is located between first and second gap layers 228 and 230 which are, in turn, located between first and second shield layers 232 and 234. In the preferred merged MR head the first component 218 of the first pole piece and the first shield layer 234 are a common layer. In an optional piggyback head these are separate layers. It should be noted from FIG. 16 that edges of each of the MR sensor 226, the first and second components 218 and 220 of the first pole piece and the second pole piece layer 216 form a portion of the ABS 48. The inverted write head 200 is embedded in the body of the slider 42 as shown in FIG. 2.

Figure 17:
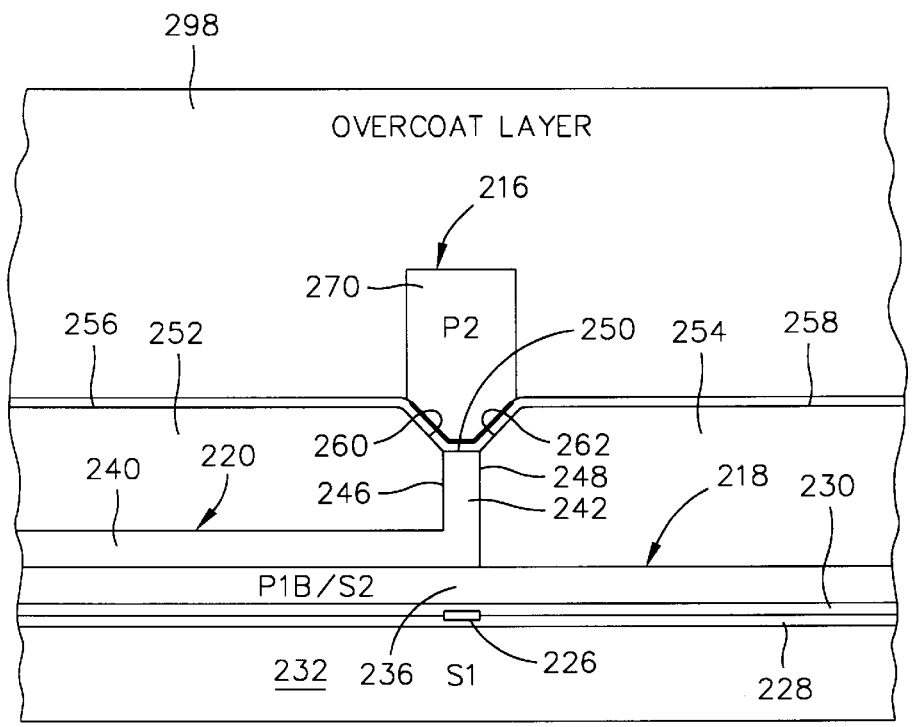
FIG. 17 is an ABS view taken along plane 17—17 of FIG. 16.
Figure 18:
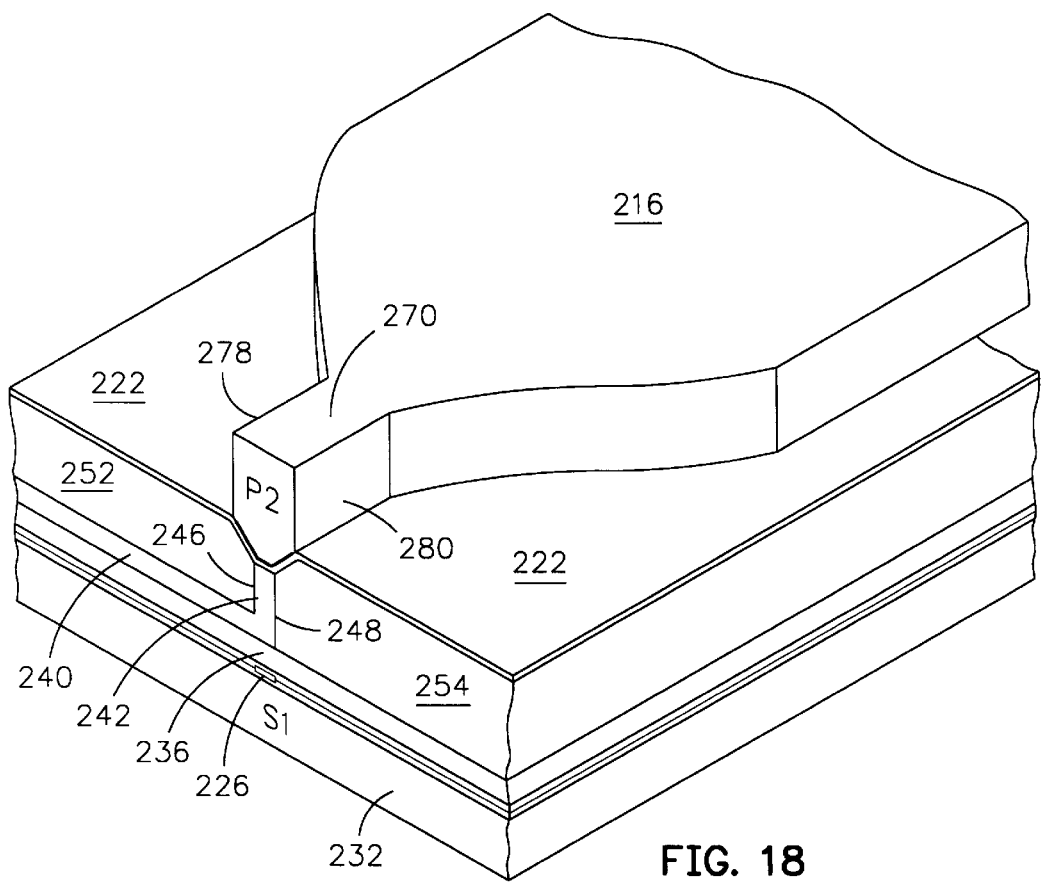
FIG. 18 is an isometric illustration of the inverted merged MR head shown in FIG. 16.
Figure 19:
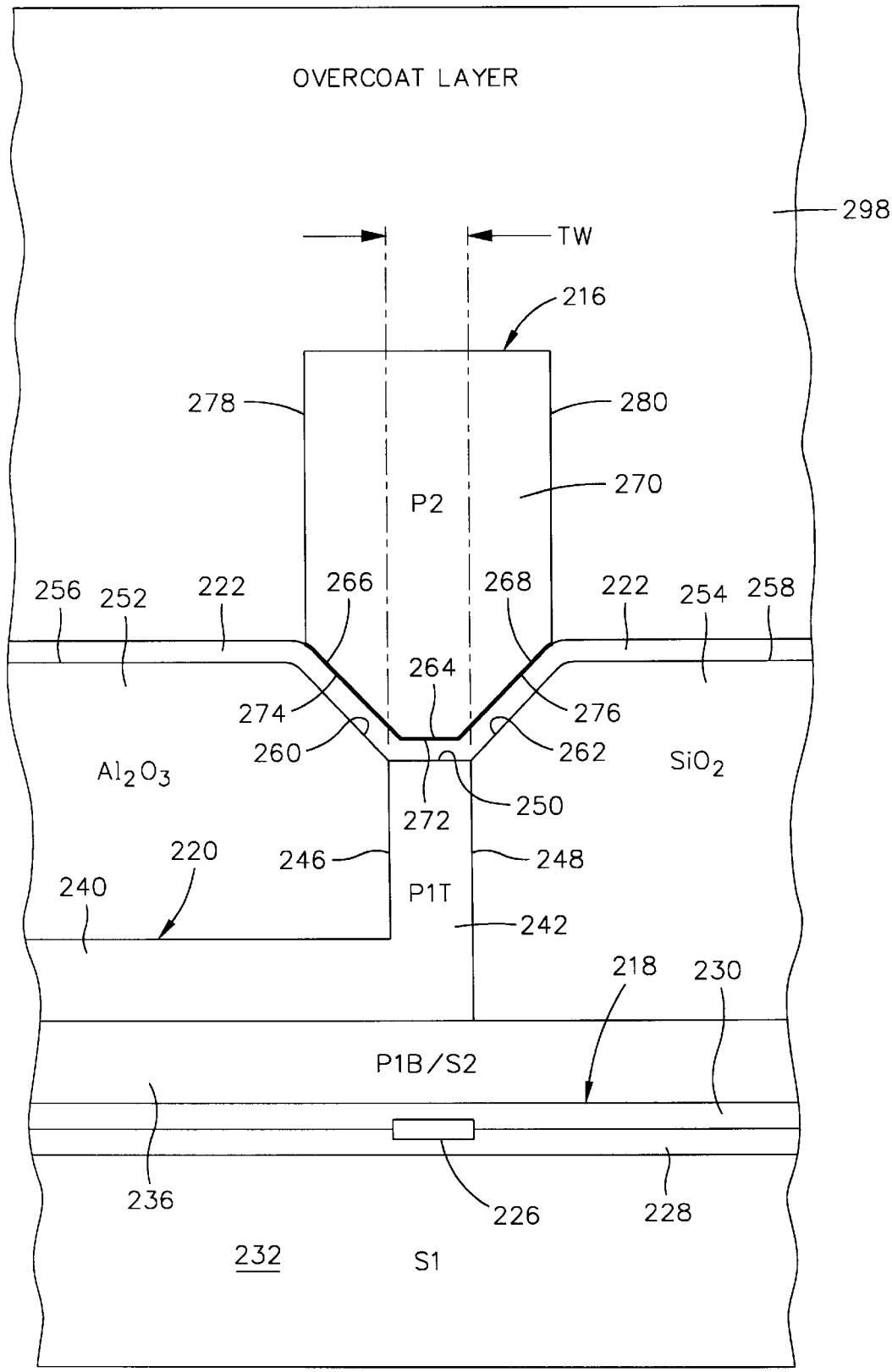
FIG. 19 is an enlarged pole tip portion of FIG. 17 so as to explain various details thereof.

As shown in FIGS. 17–19, the first component 218 of the first pole piece provides a bottom first pole tip 236 (P1B) at the ABS which may have a significant lateral expanse, as desired, for conducting sufficient flux to the ABS. The second component 220 of the first pole piece has a horizontal portion 240 and a vertical portion 242 at the ABS wherein the vertical portion 242 provides a top first pole tip (P1T) of the first pole piece (see FIG. 19). The vertical and horizontal portions 240 and 242 may extend from the ABS to a recessed back wall 241, as shown in FIG. 16, that defines the ZTH, which will be explained in more detail hereinafter. The vertical portion 242 has first and second side edges 246 and 248 which are preferably parallel with respect to one another and perpendicular to the ABS. The first and second side edges 246 and 248 define a track width of the inverted merged MR head and are boundaries for a top surface 250 of the vertical portion 242. The horizontal and vertical portions 240 and 242 are located on the bottom first pole tip layer 236 (P1B).

A forming layer 252, which will be described in more detail hereinafter, is located on the horizontal portion 240 and adjacent the first side edge 246 of the vertical portion 242. A forming structure 254, which will be described in more detail hereinafter, is located on the bottom first pole tip layer 236 and adjacent the second side edge 248 of the vertical portion 242. The forming layer has a top surface 256 and the forming structure 254 has a top surface 258. The top surface 250 of the vertical portion 242 is located below the top surfaces 256 and 258 so as to provide a recess which is formed by the top surface 250 and inclined surfaces 260 and 262 of the forming layer 252 and the forming structure 254, respectively. The write gap layer 222 is located in the recess and, by replication, has its own recess formed by a recessed surface 264 and first and second sloping surfaces 266 and 268. The write gap layer 222 may be extremely thin, such as 100–500 nanometers (nm) so that the width of the recessed portion 264 of the write gap layer is substantially the same width as the top surface 250. It should be noted that the recessed portion 264 of the write gap layer is exactly aligned with the top surface 250.

Located within the recess of the write gap layer is a second pole tip portion 270 of the second pole piece layer 216. The second pole tip 270 has a base 272 which rests on the recessed surface 264 of the write gap layer and inclined edges 274 and 276. The second pole tip also has first and second vertically oriented side edges 278 and 280 which are preferably contiguous with the sloping side edges 274 and 276. The contiguous relationship will minimize flux leakage from the corners at 278 and 280 of the second pole tip to the large expanse of the bottom first pole tip 236. Optionally, horizontal portions of the second pole tip (not shown) may interconnect the vertical side edges 278 and 280 to the sloping side edges 274 and 276. It should be noted that the width of the base 272 of the second pole tip 270 is substantially the same as the width of the vertical portion 242 (top first pole tip P1T). Because of the inclined edges 274 and 276, the second pole tip 270 is essentially notched in the same way that the first pole piece is notched in the aforementioned prior art head. This enables field signals to be transferred between the top first pole tip P1T and the second pole tip 270 substantially within the track width (TW) defined by the top first pole tip P1T. Because of the method of construction, the width of the top first pole tip P1T may be submicron, such as 0.1 $\mu$m to just less than 1.0 $\mu$m. Further, because of the method of construction, the second pole tip 270 is self-aligned with the top first pole tip P1T, which is essential for narrow track width heads.

The method of making is shown in FIGS. 20–41. The various layers of the method of making are formed by sputter deposition or plating. Sputter deposition is implemented in a vacuum chamber wherein a target of desired material is sputtered to a substrate via a plasma in the chamber because of an applied potential between the target and the substrate. Plating is a wet process wherein the wafer is placed in an electrolyte and a potential is applied between the surface to be plated and the plating material. Metallic ions from the plating material are deposited on the desired surface. Masking is accomplished by photoresist masks which are spun onto the wafer, imaged with light for portions to be removed and one or more portions are removed by a developer. After the desired layer is deposited the photoresist mask is then stripped by a dissolvent. Layer portions are removed by ion milling which is, in essence, particle bombardment of the layer with ions. Reactive ion etching (RIE) is also employed for anisotropically etching a forming structure of the invention. RIE employs a fluorine-based plasma and results in chemically etching the structure to be formed. It should be understood that these process steps are exemplary and there may be other steps well known in the art for forming the layers.

Figure 20:
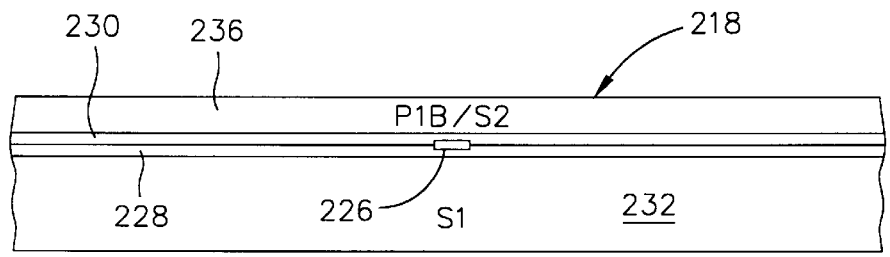
FIG. 20 is an ABS illustration of the first steps in the construction of the present inverted merged MR head.

In FIG. 20 the first shield layer 232 has been formed and the first read gap layer 228 has been formed on the first shield layer. The MR sensor 226, which may be an anisotropic magnetoresistive (AMR) sensor or a spin valve sensor and first and second leads (not shown) are formed on the first gap layer 228. The second read gap layer 230 is formed on the MR sensor 226, on the first and second leads (not shown) and on the first read gap layer 228. The bottom first pole tip layer 218, including the bottom first pole tip (P1B) 236, is formed on the second read gap layer 230.

Figure 21:
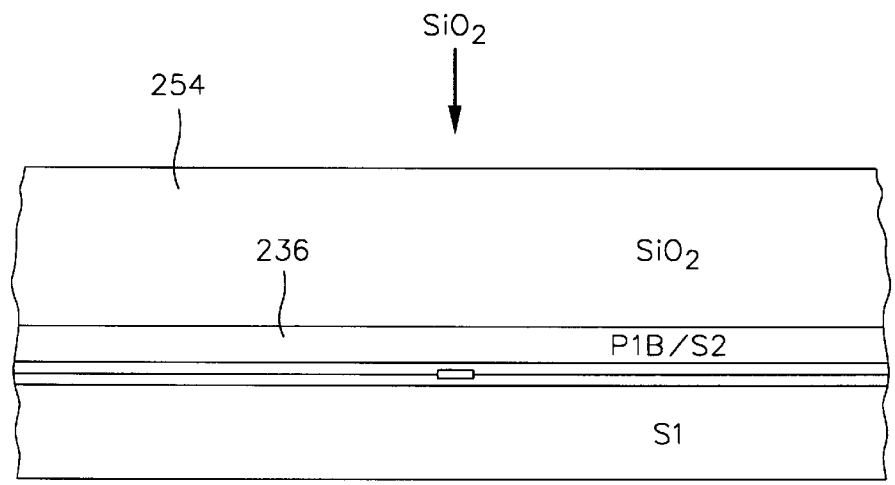
FIG. 21 is the same as FIG. 20 except a forming structural layer has been deposited thereon.
Figure 22:
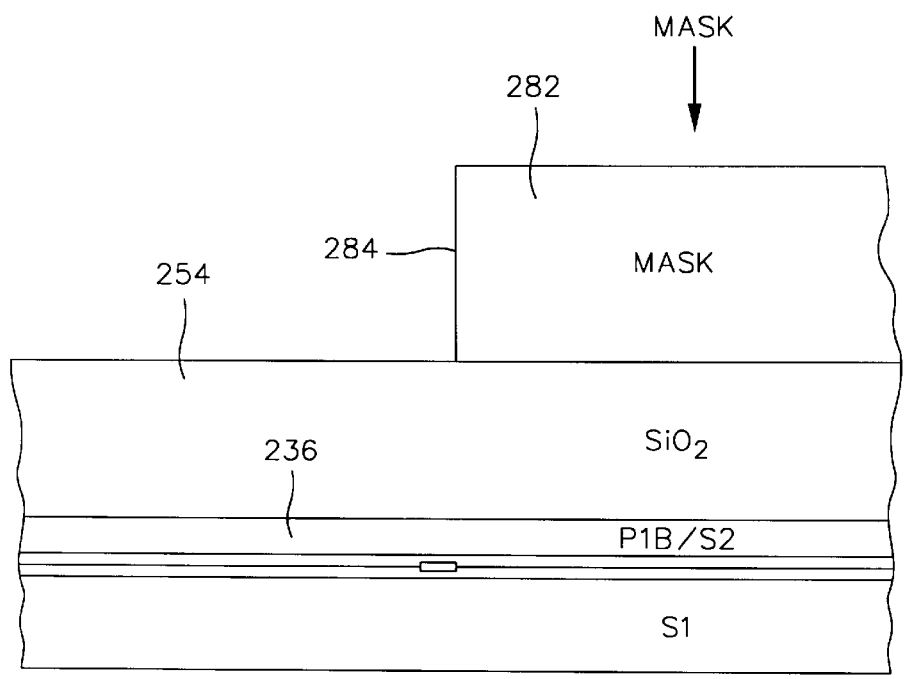
FIG. 22 is the same as FIG. 21 except the forming structure layer has been patterned by a photoresist mask.
Figure 23:
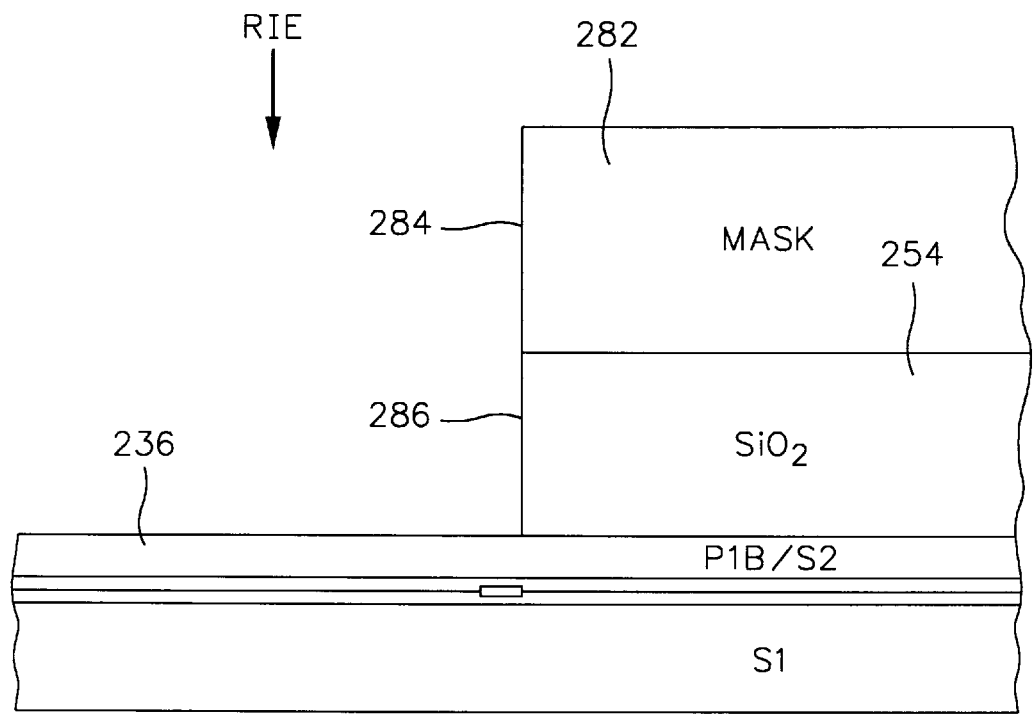
FIG. 23 is the same as FIG. 22 except reactive ion etching has been employed to remove a portion of the forming structural layer.
Figure 24:
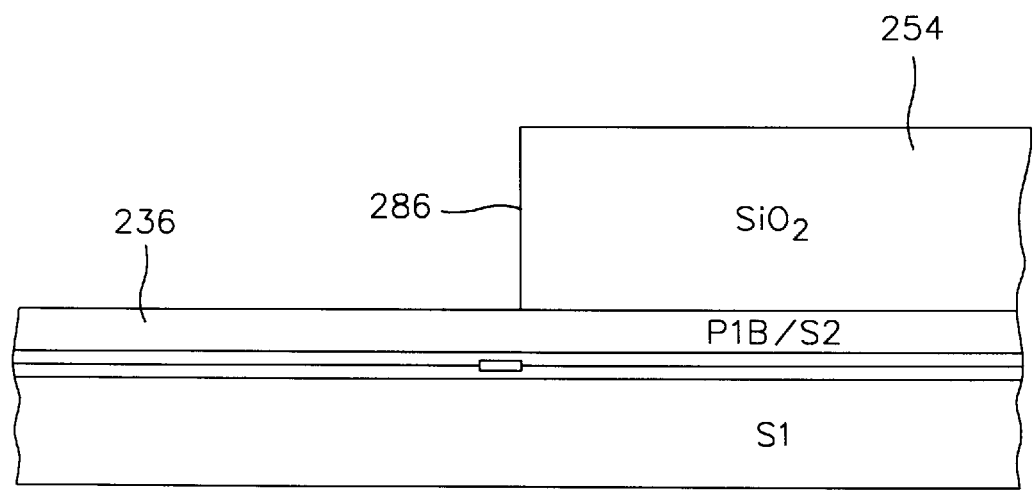
FIG. 24 is the same as FIG. 23 except the mask has been removed leaving a forming structure.

In FIG. 21 a forming structure material layer 254 is formed on the bottom first pole tip (P1B) 236. This material is of a type that can be etched by reactive ion etching (RIE). In the preferred embodiment, the material is silicon dioxide ($SiO_2$). This material should also have an ion milling rate less than an ion milling rate of the top first pole tip 242 (see FIG. 19), which will be described in more detail hereinafter. Other suitable materials are silicon nitride ($Si_3N_4$), silicon carbide (SiC) or carbon (C). In FIG. 22 a photoresist mask 282 is formed on the forming structure layer 254 with a side wall 284 that is aligned with a site for the second edge 248 (see FIG. 19) of the top first pole tip (P1T). In FIG. 23 the exposed portion of the forming structure material layer is removed by reactive ion etching resulting in the remaining forming structure 254. Because reactive ion etching is anisotropic, the forming structure 254 has a vertical side wall 286, which is vertically aligned with the side wall 284. The reactive ion etching step in FIG. 23 employs RIE that is fluorine-based in an argon atmosphere within a chamber. The preferred fluorine base is $CHF_3$. In FIG. 24 the photoresist mask 282 has been removed.

Figure 25:
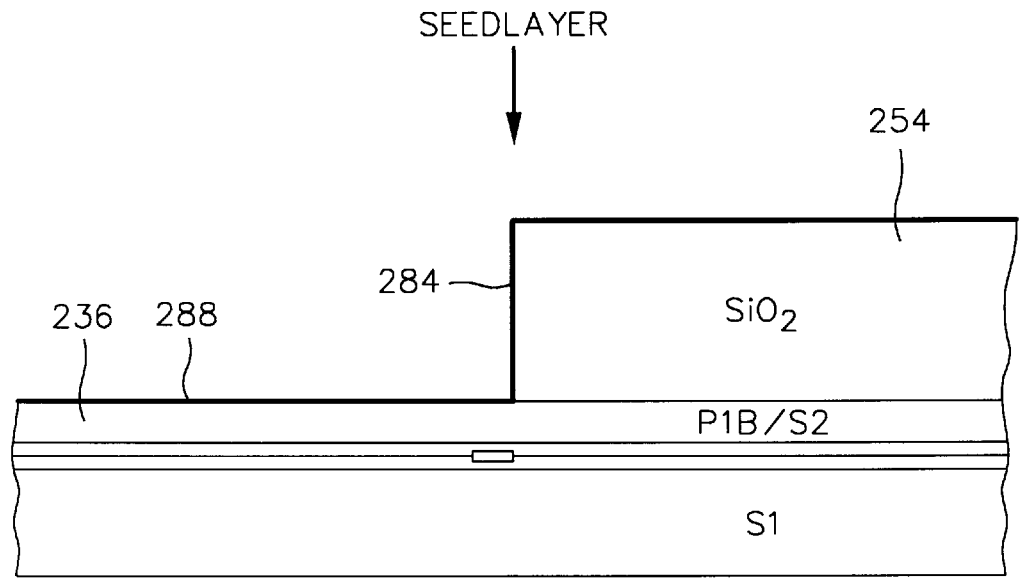
FIG. 25 is the same as FIG. 24 except a seedlayer has been deposited.
Figure 26:
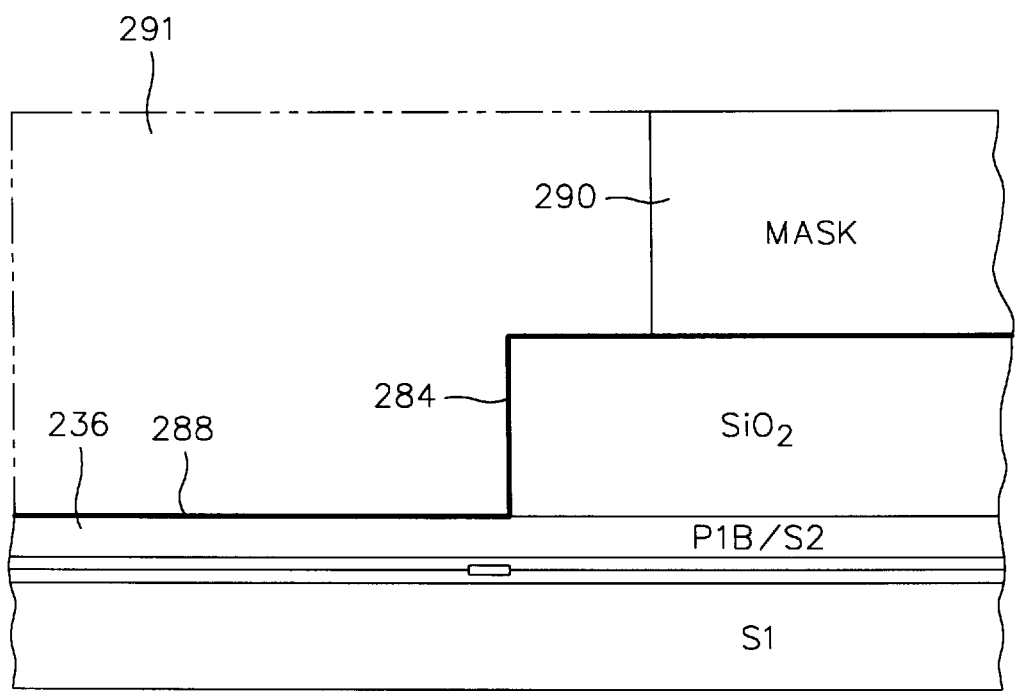
FIG. 26 is the same as FIG. 25 except a photoresist mask has been formed wherein a recessed portion of the mask is shown in phantom.
Figure 27:
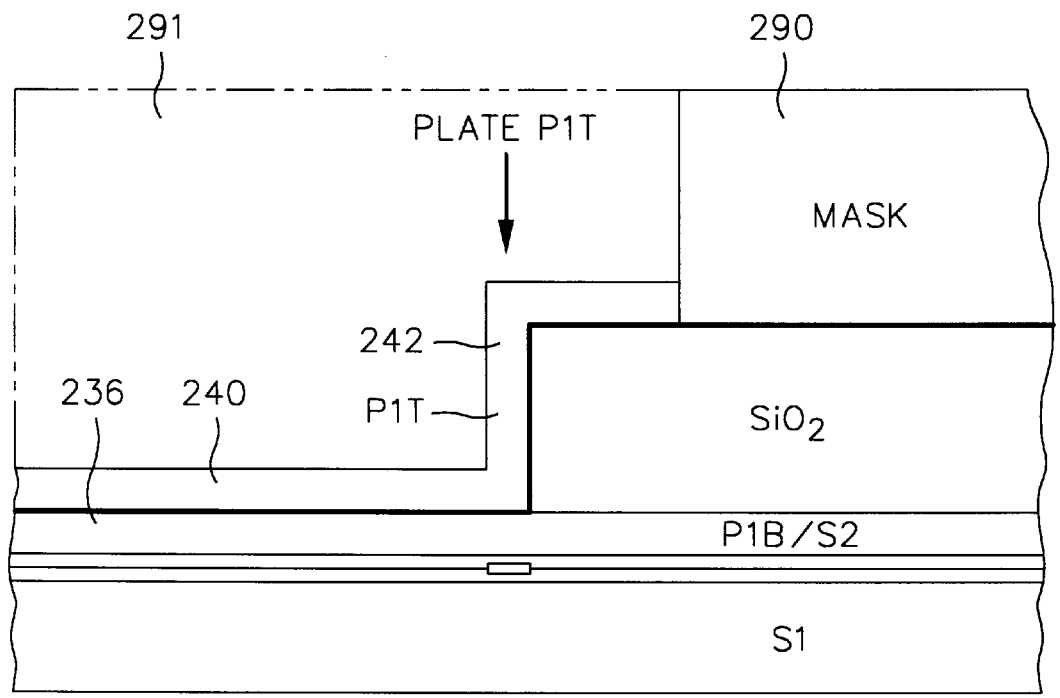
FIG. 27 is the same as FIG. 26 except a top first pole tip material layer has been deposited.
Figure 28:
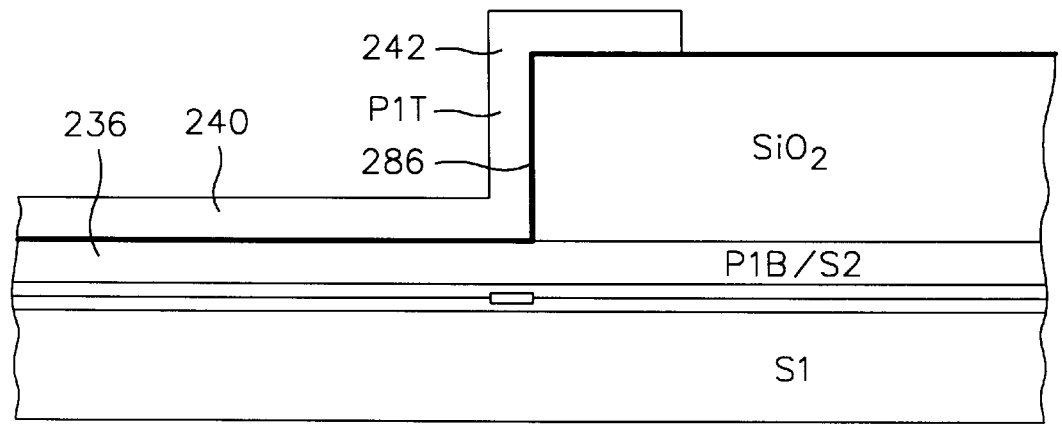
FIG. 28 is the same as FIG. 27 except the photoresist mask has been removed.

FIGS. 25–28 illustrate one aspect of the invention for forming the horizontal and vertical portions 240 and 242 (see FIG. 19). In FIG. 25 a seedlayer 288 is deposited on the vertical wall 284 and the top surfaces of the bottom first pole tip (P1B) 236 and the forming structure 254, as shown by the heavy line. In FIG. 26 a photoresist mask 290 is employed for covering areas of the partially completed head where material for the horizontal and vertical portions is unwanted. The mask has a recessed portion 291, partially outlined by the phantom lines, for forming the recessed back wall 241 (see FIG. 16) and defining the zero throat height (ZTH) where the second component 220 of the first pole piece and the second pole piece 216 first separate from one another after the ABS. In FIG. 27 ferromagnetic material, such as Permalloy, is deposited by plating to form the horizontal and vertical portions 240 and 242. In FIG. 28 the photoresist mask 290 is removed.

Figure 29:
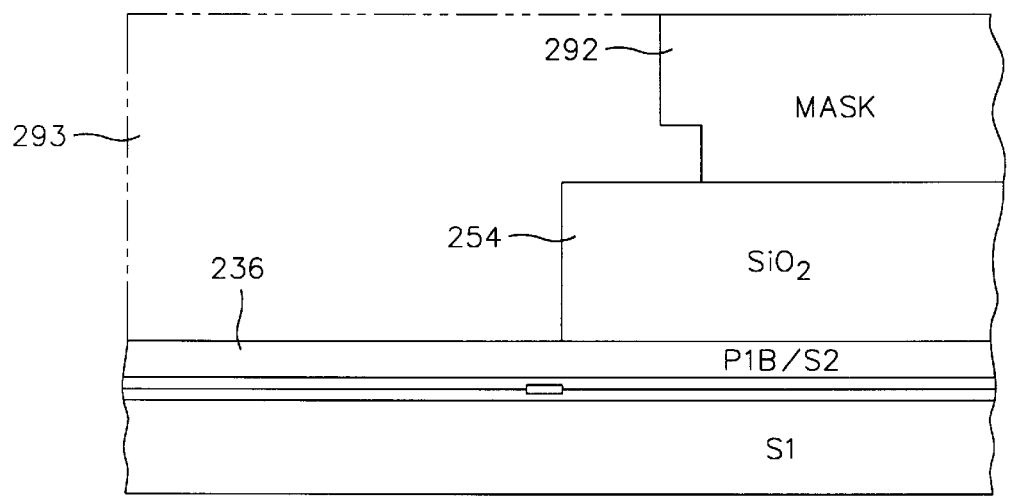
FIG. 29 is another aspect of the invention optional to that shown in FIGS. 25–28 showing an ABS view of the partially completed head wherein a bilayer photoresist mask has been formed, a recessed portion of the bilayer photoresist mask being shown in phantom.
Figure 30:
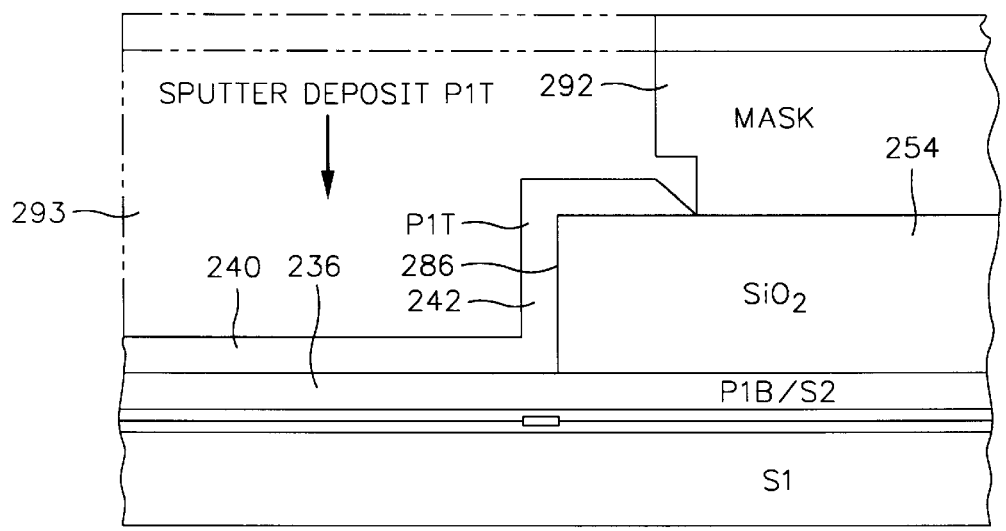
FIG. 30 is the same as FIG. 29 except top first pole tip material layer has been deposited.
Figure 31:
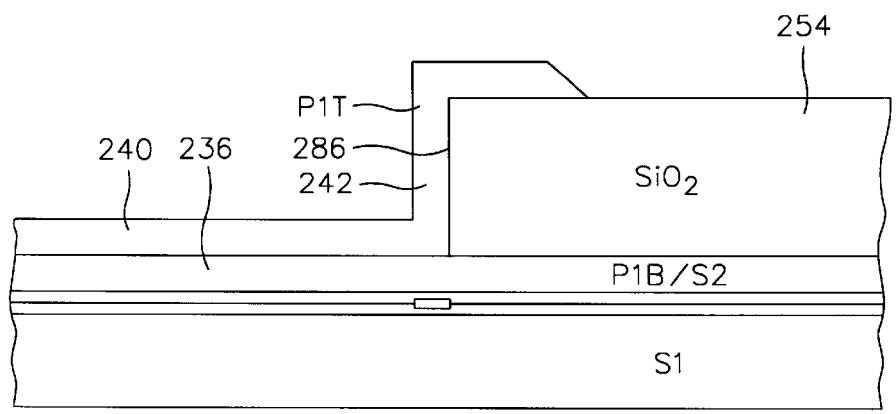
FIG. 31 is the same as FIG. 30 except the photoresist mask has been removed.

FIGS. 29–31 illustrate another aspect of the invention for constructing the horizontal and vertical portions 240 and 242 (see FIG. 19). In FIG. 29 a bilayer photoresist mask 292 is formed on top of the forming structure 254 covering areas of the partially completed head where material for the horizontal and vertical portions 240 and 242 is unwanted. The mask 292 has a recessed portion 293, partially outlined by the phantom line, for forming the back wall 241 (see FIG. 16) and defining the aforementioned ZTH. The bilayer photoresist mask has a bottom layer which dissolves at a quicker rate than a top layer so that during construction of the mask the bottom layer can be recessed with a solvent after the top layer has been light imaged and removed with the same or another solvent. Material deposited on the top of the mask is lifted off the wafer when the mask is stripped therefrom. In FIG. 30 ferromagnetic material is deposited to form the horizontal and vertical portions 240 and 242. In FIG. 31 the photoresist mask 292 is stripped from the wafer.

It should be noted that the thickness of the sputtered or plated material formed on the vertical wall 286 of the forming structure determines the width of the top first pole tip 242 (P1T) which, in turn, defines the track width (TW) of the inverted merged MR head. This deposition can be extremely thin so that submicron track widths are easily obtainable. Further, the height of the wall 286 can be set to accommodate the desired cross-section of the top first pole tip (P1T) 242 so that the top first pole tip will carry the required field signals without saturation. It should further be noted that the forming structure 254 may extend from the ABS back into the head only in the pole tip region or, preferably, can extend from the ABS to the back gap 96 (see FIGS. 16 and 18).

Figure 32:
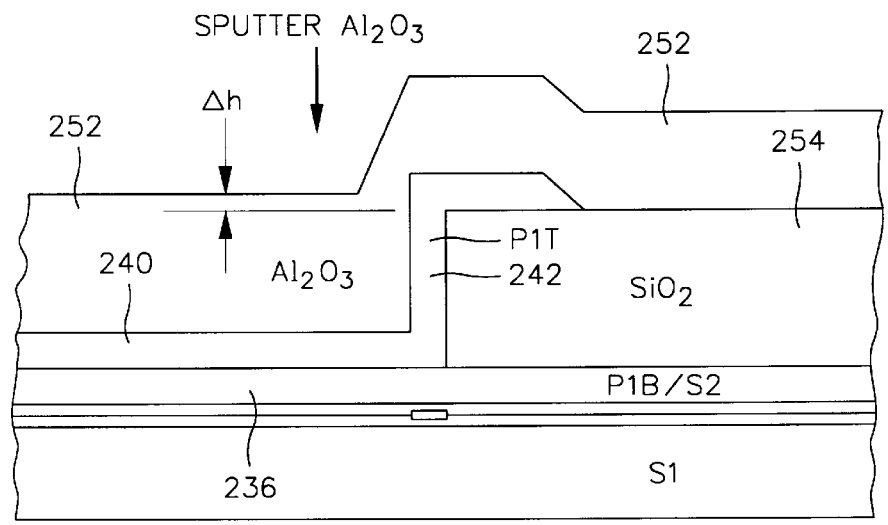
FIG. 32 is the same as FIGS. 28 or 31 except a forming layer material has been deposited thereon.
Figure 33:
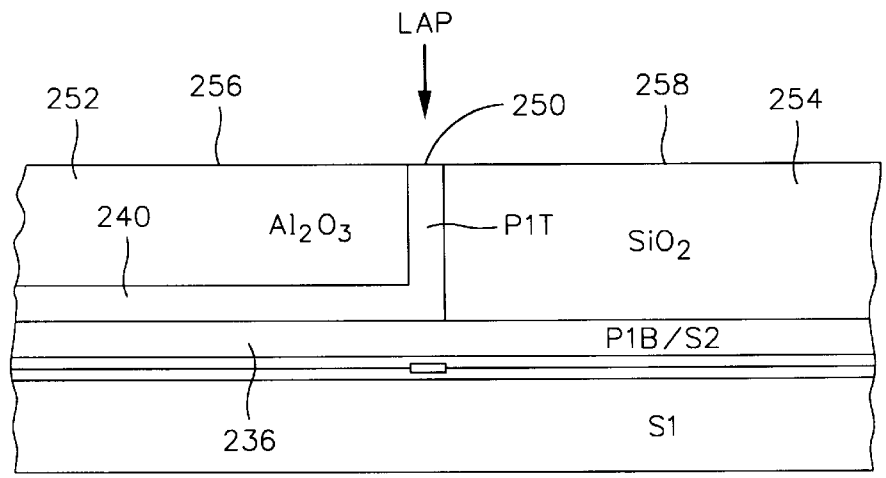
FIG. 33 is the same as FIG. 32 except the top layers have been lapped until their top surfaces are flush with one another.

In FIG. 32 the forming layer 252 is deposited on the horizontal component 240, on the partially completed top first pole tip (P1T) 242 and on the forming structure 254. The height of the forming layer 252 is preferably higher by Δh than the height of the top of the forming structure 254 in the region above the horizontal component 240. Δh is preferably 100–1500 nm. The material for the forming layer 252 is preferably alumina ($Al_2O_3$). This material should also have an ion milling rate which is less than the ion milling rate of the top first pole tip material 242, which will be described in more detail hereinafter. In FIG. 33 the partially completed head is lapped to form the top surfaces 250, 256 and 258 of the top first pole tip (P1T), the forming layer and the forming structure respectively flush with one another. This lapping removes any curvature of the write gap layer 222 (FIG. 19) formed in a subsequent step.

Figure 34:
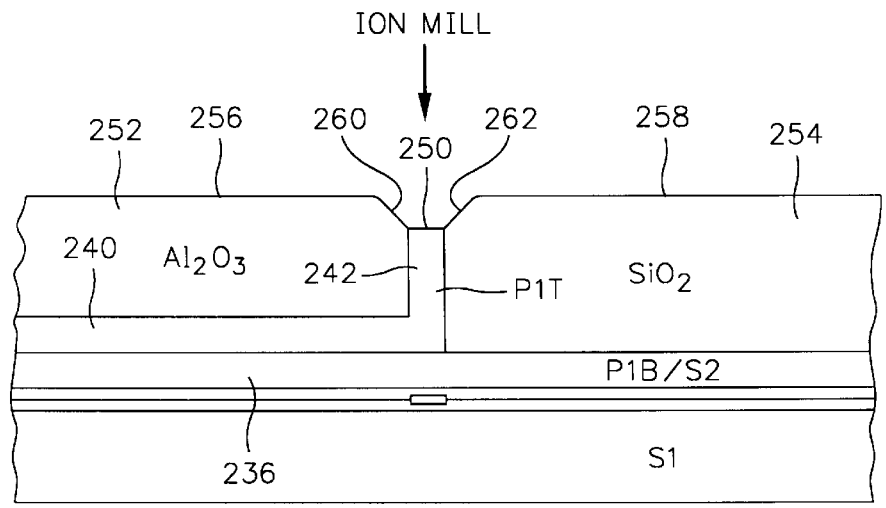
FIG. 34 is the same as FIG. 33 except ion milling is implemented to form a first recess comprising the top surfaces of the forming layer, the top first pole tip and the forming structure.

In FIG. 34 the partially completed head is ion milled causing the top surface 250 of the top first pole tip (P1T) 242 to be located below the top surfaces 256 and 258 of the forming layer and the forming structure 254, respectively. This causes portions of the top surfaces 256 and 258 to have sloping surfaces 260 and 262 that are contiguous with the top surface 250 so as to form a first recess. The material of the top first pole tip (P1T) 242 is preferably NiFe (Permalloy) so that it will mill faster than the alumina and silicon dioxide materials of the forming layer 252 and the forming structure 254. The ion milling step centers the first recess above the top surface 250 since the top first pole tip (P1T) 242 mills at a faster rate than the forming layer 252 and the forming structure 254. In a typical embodiment the top first pole tip (P1T) is $Ni_{80}Fe_{20}$. A depth of the first recess is preferably 100–1,000 nm. This means that the top surface 250 is located approximately 100–1,000 nm below the top surfaces 256 and 258. The milling rates of $Ni_{80}Fe_{20}$ is 50 nm/min, alumina is 25 nm/min and silicon dioxide is 30 nm/min.

In FIG. 35 the gap layer 222 is deposited in the first recess which causes the gap layer to form its own recess (second recess) directly above the first recess. The second recess of the write gap layer 222 is formed by a recessed portion 264 and first and second sloping portions 266 and 268 of the write gap layer. Because of the ion milling step the sloping surfaces 260 and 262 of the forming layer and the forming structure slope at an angle less than 90° to a horizontal plane. The write gap layer 222 is preferably alumina with a thickness of 100–500 nm. Because of its small thickness the second recess formed by the write gap layer substantially replicates the first recess formed by the top surfaces 250, 260 and 262 shown in FIG. 34. The recess surface 264 of the gap layer is substantially the same width as the width of the top 250 (FIG. 34) of the top first pole tip and is aligned therewith.

As shown in FIG. 36, the first insulation layer (I1), the one or more coil layers, the second insulation layer (I2) and the third insulation layer (I3) may then be formed. The first insulation layer 210, the coil layer 206, the second insulation layer 210 and the third insulation layer 212 are shown in FIG. 16. Next, a seedlayer 290 is sputter deposited on the partially completed head, as shown by the heavy line 290 in FIG. 37. The thickness of the seedlayer 290 may be on the order of 10 nm and substantially conforms to the second recess of the write gap layer 222.

Figure 39:
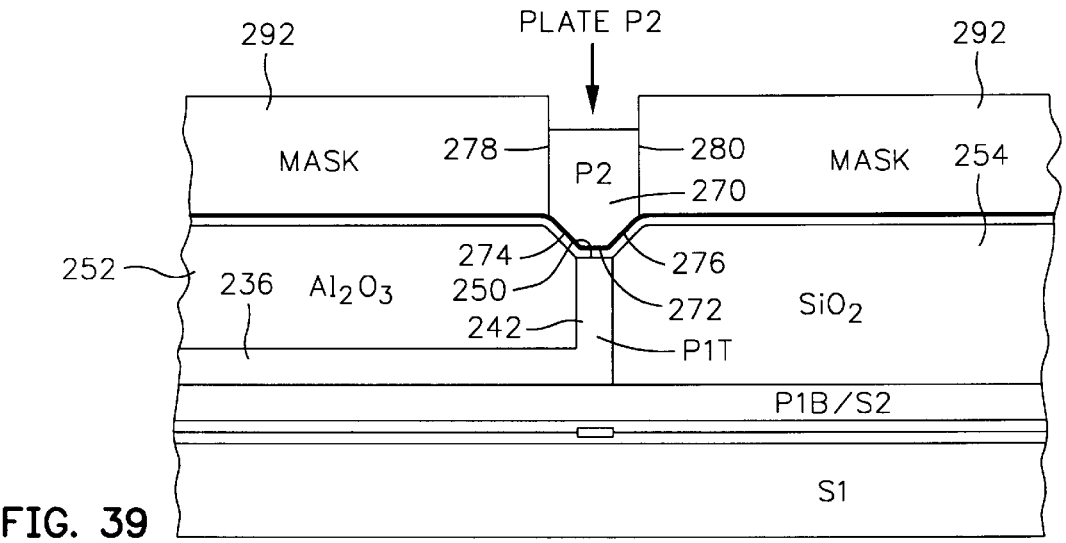
FIG. 39 is the same as FIG. 38 except a second pole tip has been formed.

In FIG. 38 a photoresist mask 292 is formed with an opening where the second pole tip 270 (FIG. 19) is to be formed. The mask 292 has first and second vertical side walls 294 and 296 which are located at the corners where the sloping portions of the seedlayer meet the horizontal portions thereof. In FIG. 39 the second pole tip 270 is plated in the opening of the mask 292. This causes the base 272 of the second pole tip to be substantially the same width as the width of the top 250 of the top first pole tip (P1T) 242 and substantially aligned therewith. The sloping edges 274 and 276 of the second pole tip slope at an angle less than 90° to a horizontal and are preferably contiguous with the first and second side edges 278 and 280. Optionally, the spacing between the side walls 294 and 296 of the mask could be less than that shown in FIG. 38, provided neither one of the side walls is located inboard of the first and second side edges 246 and 248 of the top first pole tip. The closer the side edges 278 and 280 (FIG. 39) of the second pole tip are together, the less potential there is for flux leakage between the second pole tip and the large expanse of the bottom first pole tip layer 236.

Figure 40:
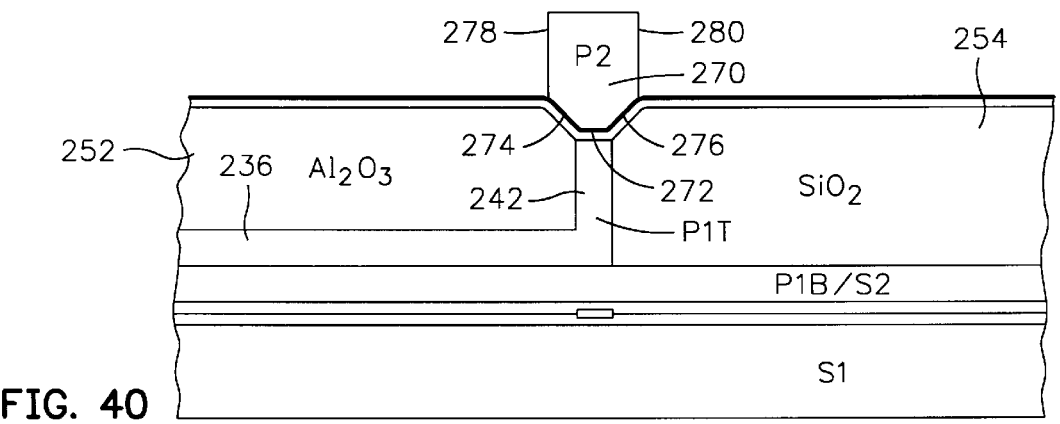
FIG. 40 is the same as FIG. 39 except the photoresist mask has been removed.
Figure 41:
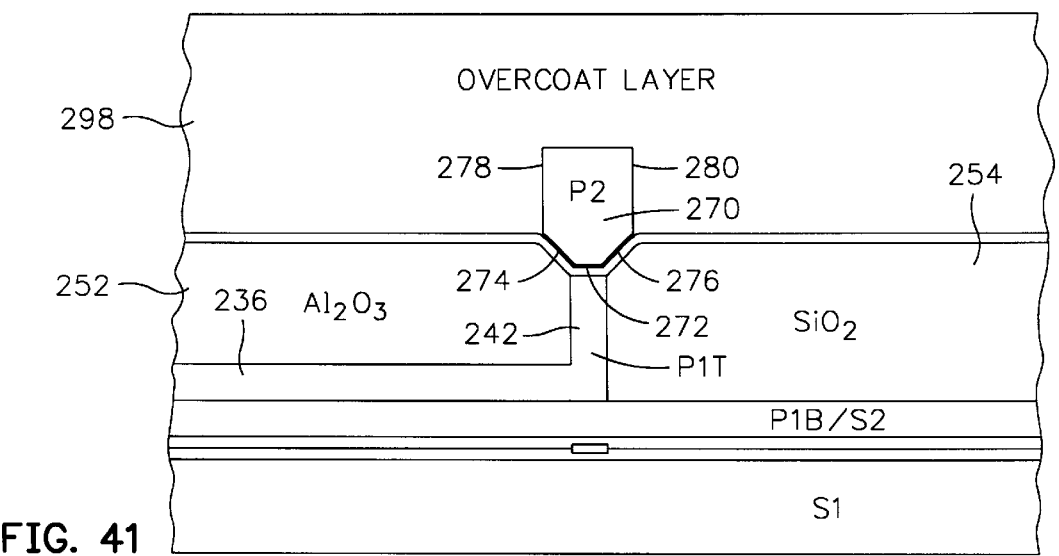
FIG. 41 is the same as FIG. 40 except portions of the seedlayer have been removed and an overcoat layer has been formed.

It should be noted that the lateral orientation of the side walls 294 and 296 (FIG. 38) of the mask 292 is not critical to good flux transfer between the top first pole tip 242 and the second pole tip 270 since they are self-aligned by the aforementioned process. As stated hereinabove, the sloping edges 274 and 276 (FIG. 39) of the second pole tip are similar to notching of the first pole piece in the prior art write head discussed hereinabove. It should be understood that the mask 292 (FIG. 38) may provide an opening for the entire second pole piece 216, as shown in FIG. 16. This is the preferred embodiment so that the entire second pole piece, including the second pole tip 270, can be constructed in one plating step. In FIG. 40 the mask 292 has been removed and in FIG. 41 portions of the seedlayer on each side of the top first pole piece (P1T) have been removed followed by forming an overcoat layer 298, thereby substantially completing the inverted merged MR head.

The thickness of the bottom first pole piece (P1B) 218 (FIG. 17) may be substantially thinner than prior art first pole piece layers at the ABS. The preferred thickness of the bottom first pole piece is 0.1 to 3.0 µm. The preferred thickness of the forming structure 254 is 500–4,000 nm thick. It should be noted that the thickness of the top first pole tip material (P1T) 242 deposited on the vertical wall 286 of the forming structure (FIGS. 27 and 30) can be very accurately monitored and measured so as to reduce process variations of the track width of the top first pole tip. Further, it should be noted that the top first pole tip (P1T) 242 can be constructed of a different material than the bottom first pole tip (P1B) 236 and the second pole tip 270. For instance, the top first pole tip (P1T) 242 may be constructed of a high moment material such as $Ni_{45}Fe_{55}$ or CoNiFe. Another important aspect of this invention is that the recessed portions 291 or 293 of the masks in FIGS. 27 and 30 form the horizontal and vertical portions 240 and 242 with a back wall 241 (see FIG. 16) which defines the ZTH. It should further be noted that the lapping step in FIG. 33 will completely eliminate any write gap curvature caused by replication of the profile of the MR sensor 226. Further, any mechanical damage encountered from the lapping in FIG. 33 is overcome by the smoothing effect of the ion milling in FIG. 34. It should also be noted that the forming structure 254 provides a foundation for the very thin top first pole tip (P1T) 242. Without this foundation the pedestal-type top first pole tip (P1T) 242 is subject to being broken by subsequent process steps.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. An inverted magnetic write head, which has an air bearing surface (ABS), comprising:

a first pole piece having a first component wherein the first component has a first surface;

the first pole piece having a second component on the first surface of the first component wherein the second component has a first surface and first and second edges that define a track width W1 of the head at the ABS;

a forming layer on the first surface of the first component adjacent the first edge of the second component and having a first surface with a flat portion spaced from the first surface of the second component in a direction away from the first surface of the first component;

a forming structure on the first surface of the first component adjacent the second edge of the second component and having a first surface with a flat portion spaced from the first surface of the second component in a direction away from the first surface of the first component;

the first surface of the second component and a sloping portion of each of the forming layer and the forming structure forming a first recess with the first surface of the second component forming a bottom surface of the first recess;

a write gap layer in said first recess and having a second recess; and a second pole piece in the second recess of the write gap layer with first and second edges that define a width W2 at the ABS.

2. A write head as claimed in claim 1 wherein the forming structure is a layer with a thickness of 500–4000 nm.

3. A write head as claimed in claim 1 wherein the forming structure is $SiO_2$.

4. A write head as claimed in claim 1 including:

the forming structure having a forming wall that is substantially perpendicular to the first surface of the first component.

5. A write head as claimed in claim 1 including:

the second component having a recessed back wall, recessed from the ABS, that defines a zero throat height (ZTH) where the first and second pole pieces first commence to separate after the ABS.

6. A write head as claimed in claim 1 including:

the bottom surface of the first recess having a width W3 at the ABS wherein the width W3 is substantially equal to the width W1; and the second recess having a bottom surface that has substantially said width W3.

7. A write head as claimed in claim 1 including:

the first recess having first and second sloping side surfaces that slope upwardly from the bottom surface of the first recess at an angle less than 90 degrees with respect to said bottom surface.

8. A write head as claimed in claim 1 wherein W2 is greater than W1.

9. A write head as claimed in claim 1 wherein the forming structure is $SiO_2$, the forming layer is $Al_2O_3$ and the second component comprises NiFe.

10. A write head as claimed in claim 9 wherein the forming structure is a layer with a thickness of 500–4000 nm.

11. A write head as claimed in claim 10 wherein the forming structure is $SiO_2$.

12. A write head as claimed in claim 11 including:

the forming wall being substantially perpendicular to the first surface of the first component.

13. A write head as claimed in claim 12 including:

the second component having a recessed back wall, recessed from the ABS, that defines a zero throat height (ZTH) where the first and second pole pieces first commence to separate after the ABS.

14. A write head as claimed in claim 13 including:

the bottom surface of the first recess having a width W3 at the ABS wherein the width W3 is substantially equal to the width W1; and the second recess having a bottom surface that has substantially said width W3.

15. A write head as claimed in claim 14 including:

the first recess having first and second sloping side surfaces that slope upwardly from the bottom surface of the first recess at an angle less than 90 degrees with respect to said bottom surface.

16. A write head as claimed in claim 15 wherein W2 is greater than W1.

17. A write head as claimed in claim 16 wherein the first recess has a depth of 100–1,000 nm.

18. A write head as claimed in claim 17 wherein the W2 is 1–3 µm greater than the width W1.

19. A write head as claimed in claim 18 wherein the first component has a thickness of 0.1–3 µm and the second component has a thickness of the 0.1–1.5 µm.

20. A write head as claimed in claim 19 wherein the second component is constructed of a higher magnetic moment material than a magnetic moment material of each of the first component and the second pole piece.

21. A write head as claimed in claim 20 wherein the write gap layer has a thickness of 0.1 to 0.5 µm.

22. A write head as claimed in claim 21 including:
a first insulation layer of an insulation stack;
at least one coil layer on the first insulation layer; and
at least a second insulation layer of an insulation stack on said at least one coil layer.

23. An inverted merged magnetoresistive (MR) head, which has an air bearing surface (ABS), comprising:
a first shield layer;
a first read gap layer on the first shield layer;
an MR sensor layer and first and second lead layers on the first read gap layer with the first and second lead layers connected to the MR sensor layer;
a second read gap layer on the MR sensor layer and the first and second lead layers;
a first pole piece on the second read gap layer having a first component wherein the first component has a first surface;
the first pole piece having a second component on the first surface of the first component wherein the second component has a first surface and first and second edges that define a track width W1 of the head at the ABS;
a forming layer on the first surface of the first component adjacent the first edge of the second component and having a first surface with a flat portion spaced from the first surface of the second component in a direction away from the first surface of the first component;
a forming structure on the first surface of the first component adjacent the second edge of the second component and having a first surface with a flat portion spaced from the first surface of the second component in a direction away from the first surface of the first component;
the first surface of the second component and a sloping portion of each of the forming layer and the forming structure forming a first recess with the first surface of the second component forming a bottom surface of the first recess;
a write gap layer in said first recess and having a second recess;
a second pole piece in the second recess of the write gap layer with first and second edges that define a width W2 at the ABS;
a first insulation layer on the first pole piece;
at least one coil layer on the insulation layer; and
at least a second insulation layer on said at least one coil layer.

24. A merged MR head as claimed in claim 23 wherein the forming structure is $SiO_2$, the forming layer is $Al_2O_3$ and the second component comprises NiFe.

25. A merged MR head as claimed in claim 24 wherein the forming structure is a layer with a thickness of 500–4000 nm.

26. A merged MR head as claimed in claim 25 wherein the forming structure is $SiO_2$.

27. A merged MR head as claimed in claim 26 including:
the forming structure having a forming wall that is substantially perpendicular to the first surface of the first component.

28. A merged MR head as claimed in claim 27 including:
the second component having a recessed back wall, recessed from the ABS, that defines a zero throat height (ZTH) where the first and second pole pieces first commence to separate after the ABS.

29. A merged MR head as claimed in claim 28 including:
the bottom surface of the first recess having a width W3 at the ABS wherein the width W3 is substantially equal to the width W1; and
the second recess having a bottom surface that has substantially said width W3.

30. A merged MR head as claimed in claim 29 including:
the first recess having first and second sloping side surfaces that slope upwardly from the bottom surface of the first recess at an angle less than 90 degrees with respect to said bottom surface.

31. A merged MR head as claimed in claim 30 wherein W2 is greater than W1.

32. A magnetic disk drive comprising:
a merged magnetoresistive (MR) head, which has an air bearing surface (ABS), including:
a first shield layer;
a first read gap layer on the first shield layer;
an MR sensor layer and first and second lead layers on the first read gap layer with the first and second lead layers connected to the MR sensor layer;
a second read gap layer on the MR sensor layer and the first and second lead layers;
a first pole piece on the second read gap layer having a first component wherein the first component has a first surface;
the first pole piece having a second component on the first surface of the first component wherein the second component has a first surface and first and second edges that define a track width W1 of the head at the ABS;
a forming layer on the first surface of the first component adjacent the first edge of the second component and having a first surface with a flat portion spaced from the first surface of the second component in a direction away from the first surface of the first component;
a forming structure on the first surface of the first component adjacent the second edge of the second component and having a first surface with a flat portion spaced from the first surface of the second component in a direction away from the first surface of the first component;
the first surface of the second component and a sloping portion of each of the forming layer and the forming structure forming a first recess with the first surface of the second component forming a bottom surface of the first recess;
a write gap layer in said first recess and having a second recess;
a second pole piece in the second recess of the write gap layer with first and second edges that define a width W2 at the ABS;

a first insulation layer on the first pole piece;
at least one coil layer on the insulation layer; and
at least a second insulation layer on said at least one coil layer;
a frame;
a magnetic disk rotatably supported on the frame;
a support mounted on the frame for supporting the head in a transducing relationship with the magnetic disk;
means for rotating the magnetic disk;
positioning means connected to the support for moving the head to multiple positions with respect to said magnetic disk; and
means connected to the head, to the means for rotating the magnetic disk and to the positioning means for exchanging signals with the head, for controlling movement of the magnetic disk and for controlling the position of the head.

33. A disk drive as claimed in claim 32 wherein the forming structure is $SiO_2$, the forming layer is $Al_2O_3$ and the second component comprises NiFe.

34. A disk drive as claimed in claim 33 wherein the forming structure is a layer with a thickness of 500–4000 nm.

35. A disk drive as claimed in claim 34 wherein the forming structure is $SiO_2$.

36. A disk drive as claimed in claim 35 including:
the forming structure having a forming wall that is substantially perpendicular to the first surface of the first component.

37. A disk drive as claimed in claim 36 including:
the second component having a recessed back wall, recessed from the ABS, that defines a zero throat height (ZTH) where the first and second pole pieces first commence to separate after the ABS.

38. A disk drive as claimed in claim 37 including:
the bottom surface of the first recess having a width W3 at the ABS wherein the width W3 is substantially equal to the width W1; and
the second recess having a bottom surface that has substantially said width W3.

39. A disk drive as claimed in claim 38 including:
the first recess having first and second sloping side surfaces that slope upwardly from the bottom surface of the first recess at an angle less than 90 degrees with respect to said bottom surface.

40. A disk drive as claimed in claim 39 wherein W2 is greater than W1.

* * * * *